(12) United States Patent
Rico Alvarino et al.

(10) Patent No.: US 11,153,830 B2
(45) Date of Patent: Oct. 19, 2021

(54) EMISSION LIMIT INDICATION TECHNIQUES FOR AERIAL WIRELESS DEVICES

(71) Applicant: QUALCOMM incorporated, San Diego, CA (US)

(72) Inventors: Alberto Rico Alvarino, San Diego, CA (US); Marco Papaleo, Bologna (IT); Le Liu, Fremont, CA (US); Umesh Phuyal, San Diego, CA (US); Stefano Faccin, San Ysidro, CA (US); Timo Ville Vintola, San Diego, CA (US); Gene Fong, San Diego, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/928,997

(22) Filed: Jul. 14, 2020

(65) Prior Publication Data

US 2021/0051595 A1     Feb. 18, 2021

Related U.S. Application Data

(60) Provisional application No. 62/887,142, filed on Aug. 15, 2019.

(51) Int. Cl.
*H04W 52/14* (2009.01)
*H04W 52/42* (2009.01)
*H04W 52/28* (2009.01)

(52) U.S. Cl.
CPC ......... *H04W 52/146* (2013.01); *H04W 52/28* (2013.01); *H04W 52/283* (2013.01); *H04W 52/42* (2013.01)

(58) Field of Classification Search
CPC . H04B 7/18502; H04W 52/146; H04W 52/28
(Continued)

(56) References Cited

U.S. PATENT DOCUMENTS

| 10,349,467 | B2 * | 7/2019 | Hoffmann | ............ | H05B 6/1209 |
| 2004/0127240 | A1 * | 7/2004 | Li | ......................... | H04W 48/18 |
| | | | | | 455/500 |

(Continued)

FOREIGN PATENT DOCUMENTS

WO     WO-2018224168 A1     12/2018

OTHER PUBLICATIONS

Huawei, et al., "UL Enhancements for Drones," 3GPP Draft, 3GPP TSG RAN WG1 Meeting #91, R1-1720110, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 27, 2017-Dec. 1, 2017, Nov. 17, 2017 (Nov. 17, 2017), XP051369223, 4 pages, Retrieved from the Internet: URL: http://www.3gpp.org/ftp/tsg%5Fran/WG1%5FRL1/TSGR1%5F91/Docs/ [retrieved on Nov. 17, 2017] the whole document.

(Continued)

*Primary Examiner* — John J Lee
(74) *Attorney, Agent, or Firm* — Holland & Hart LLP

(57) ABSTRACT

Methods, systems, and devices for wireless communications are described in which a base station may signal one or more emission limits for one or more different frequency bands, and two or more values for one of the emission limits may be provided. A first subset of user equipments (UEs) may be capable of aerial operations (e.g., unmanned aerial vehicles (UAVs) or drones) and may use a first value of the first emission limit and the second subset of UEs may not capable of aerial operations and may use a second value of the first emission limit. A UE status such as altitude or position, or (Continued)

transmission directivity may also be used to determine if the UE is to apply the first value or the second value for an emission limit of a frequency band.

30 Claims, 21 Drawing Sheets

(58) Field of Classification Search
USPC ....... 455/517, 520, 433, 452.1, 509, 522, 69
See application file for complete search history.

(56) References Cited

U.S. PATENT DOCUMENTS

2020/0008159 A1* 1/2020 Kosseifi ............ H04W 52/0212
2020/0213956 A1* 7/2020 Friden ................ H04B 7/18504

OTHER PUBLICATIONS

International Search Report and Written Opinion—PCT/US2020/042250—ISA/EPO—dated Oct. 28, 2020.

* cited by examiner

EMISSION LIMIT INDICATION TECHNIQUES FOR AERIAL WIRELESS DEVICES

CROSS REFERENCE

The present application for patent claims the benefit of U.S. Provisional Patent Application No. 62/887,142 by RICO ALVARINO et al., entitled "EMISSION LIMIT INDICATION TECHNIQUES FOR AERIAL WIRELESS DEVICES," filed Aug. 15, 2019, assigned to the assignee hereof, and expressly incorporated by reference herein.

BACKGROUND

The following relates generally to wireless communications and to emission limit indication techniques for aerial wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support emission limit indication techniques for aerial wireless devices. Various described techniques provide for multiple different emission limits for a particular frequency band. In some cases, a base station may signal one or more emission limits for one or more different frequency bands, in which two or more values for one of the emission limits may be provided. For example, a first frequency band may have a first emission limit that has a first value that is to be applied to a first subset of UEs and a second value that is to be applied to a second subset of UEs. Thus, different UEs communicating using the first frequency band may have different emission limits. In some cases, the first subset of UEs may be capable of aerial operations (e.g., unmanned aerial vehicles (UAVs) or drones) and may use the first value of the first emission limit and the second subset of UEs may not be capable of aerial operations (e.g., handheld UEs, UEs incorporated in machines or vehicles, other terrestrial UEs, etc.) and may use the second value of the first emission limit. In some cases, a UE status or transmission directivity may be used to determine if the UE is to apply the first value or the second value for an emission limit of a frequency band.

A method of wireless communication at a UE is described. The method may include receiving, from a base station, an indication of one or more emission limits for at least a first frequency band, where at least a first emission limit has a first value that is associated with a first UE device type and a second value that is associated with a second UE device type, determining to apply the first value of the first emission limit to one or more uplink transmissions of the UE based on the UE having the first UE device type, and transmitting the one or more uplink transmissions from the UE based on the first value of the first emission limit.

An apparatus for wireless communication at a UE is described. The apparatus may include a processor, memory to the processor, and instructions stored in the memory. The instructions may be executable by the processor to cause the apparatus to receive, from a base station, an indication of one or more emission limits for at least a first frequency band, where at least a first emission limit has a first value that is associated with a first UE device type and a second value that is associated with a second UE device type, determine to apply the first value of the first emission limit to one or more uplink transmissions of the UE based on the UE having the first UE device type, and transmit the one or more uplink transmissions from the UE based on the first value of the first emission limit.

Another apparatus for wireless communication at a UE is described. The apparatus may include means for receiving, from a base station, an indication of one or more emission limits for at least a first frequency band, where at least a first emission limit has a first value that is associated with a first UE device type and a second value that is associated with a second UE device type, determining to apply the first value of the first emission limit to one or more uplink transmissions of the UE based on the UE having the first UE device type, and transmitting the one or more uplink transmissions from the UE based on the first value of the first emission limit.

A non-transitory computer-readable medium storing code for wireless communication at a UE is described. The code may include instructions executable by a processor to receive, from a base station, an indication of one or more emission limits for at least a first frequency band, where at least a first emission limit has a first value that is associated with a first UE device type and a second value that is associated with a second UE device type, determine to apply the first value of the first emission limit to one or more uplink transmissions of the UE based on the UE having the first UE device type, and transmit the one or more uplink transmissions from the UE based on the first value of the first emission limit.

In some examples of the method, apparatuses, and non-transitory computer-readable medium described herein, the first UE device type corresponds to UEs that is capable of airborne operations, and the second UE device type corresponds to terrestrial UEs. In some examples of the method, apparatuses, and non-transitory computer-readable medium described herein, the determining further may include operations, features, means, or instructions for determining a status of the UE as one of an aerial status or a grounded status, and where the determining to apply the first value of the first emission limit may be further based on the status of the UE.

In some examples of the method, apparatuses, and non-transitory computer-readable medium described herein, the status of the UE may be based on an altitude of the UE, and where the first value of the first emission limit is applied to the one or more uplink transmissions when the altitude of the UE is at or above a height threshold and the second value of the first emission limit is applied to the one or more uplink transmissions when the altitude of the UE is less than the height threshold. In some examples of the method, apparatuses, and non-transitory computer-readable medium described herein, the indication of the one or more emission limits may be received in a broadcast transmission from the base station. In some examples of the method, apparatuses, and non-transitory computer-readable medium described herein, the broadcast transmission from the base station includes a system information block transmission that indicates a list of emission limits for the first frequency band. Some examples of the method, apparatuses, and non-transitory computer-readable medium described herein may further include operations, features, means, or instructions for transmitting an indication of the first device type of the UE to the base station. In some examples of the method, apparatuses, and non-transitory computer-readable medium described herein, the indication of one or more emission limits may be received, responsive to the transmitted indication of the first device type, via one or more of radio resource control (RRC) signaling, a control element (e.g., a medium access control (MAC) control element (CE)), or any combinations thereof.

Some examples of the method, apparatuses, and non-transitory computer-readable medium described herein may further include operations, features, means, or instructions for receiving, from the base station, geofencing parameters that indicate one or more locations at which the first value of the first emission limit applies to UEs having the first UE device type, and where the second value of the first emission limit applies to UEs having the first UE device type that are outside of the one or more locations indicated by the geofencing parameters and determining that a position of the UE is within an area indicated by the geofencing parameters.

In some examples of the method, apparatuses, and non-transitory computer-readable medium described herein, the first value of the first emission limit is applied to at least a first uplink transmission of the UE based on the UE being within the area indicated by the geofencing parameters. In such examples of the method, apparatuses, and non-transitory computer-readable medium described herein, the method, apparatuses, and non-transitory computer-readable medium described herein may further include operations, features, means, or instructions for determining, after transmitting the first uplink transmission, that a subsequent position of the UE is outside of the area indicated by the geofencing parameters and transmitting, based on the subsequent position of the UE, at least a second uplink transmission using the second value of the first emission limit.

In some examples of the method, apparatuses, and non-transitory computer-readable medium described herein, the geofencing parameters indicate one or more of an area in which the first value of the first emission limit is to be used, an altitude above which the first value of the first emission limit is to be used, vertices of a polyhedron within which the first value of the first emission limit is to be used, a center and radius of a sphere within which the first value of the first emission limit is to be used, or any combinations thereof. In some examples of the method, apparatuses, and non-transitory computer-readable medium described herein, the first value of the first emission limit is used for all uplink transmissions when UE position information may be unavailable.

Some examples of the method, apparatuses, and non-transitory computer-readable medium described herein may further include operations, features, means, or instructions for determining a power backoff for the one or more uplink transmissions based on the first emission limit, and applying the power backoff to the one or more uplink transmissions as an additional maximum power reduction. Some examples of the method, apparatuses, and non-transitory computer-readable medium described herein may further include operations, features, means, or instructions for transmitting an indication to the base station that the first value of the first emission limit is being used at the UE for the one or more uplink transmissions. In some examples of the method, apparatuses, and non-transitory computer-readable medium described herein, the indication may be provided in one or more of a RRC signaling message or a MAC-CE) that explicitly indicates the first value of the first emission limit is being used. In some examples of the method, apparatuses, and non-transitory computer-readable medium described herein, the indication may be provided in a power headroom report that is transmitted to the base station that implicitly indicates based on a reported power headroom value that the first value of the first emission limit is being used.

In some examples of the method, apparatuses, and non-transitory computer-readable medium described herein, the determining to apply the first value of the first emission limit may be further based on a directional antenna pattern of the UE.

In some examples of the method, apparatuses, and non-transitory computer-readable medium described herein, the indication of one or more emission limits provides a victim location associated with the first value of the first emission limit, the second value of the first emission limit is applied to uplink transmissions when the directional antenna pattern is oriented away from the victim location, and the first value of the first emission limit is applied to uplink transmissions when the directional antenna pattern is oriented toward the victim location. In some examples of the method, apparatuses, and non-transitory computer-readable medium described herein, the indication of one or more emission limits provides an indication of a first subset of transmission beams that are associated with the first value of the first emission limit, and where a second subset of transmission beams are associated with the second value of the first emission limit. Some examples of the method, apparatuses, and non-transitory computer-readable medium described herein may further include operations, features, means, or instructions for selecting a sub-optimal beam from the second subset of transmission beams when a more optimal beam is in the first subset of transmission beams, and where the second value of the first emission limit is used for the one or more uplink transmissions using the sub-optimal beam from the second subset of transmission beams.

In some examples of the method, apparatuses, and non-transitory computer-readable medium described herein, the indication of one or more emission limits includes one or more angular constraints that are associated with the first value of the first emission limit, and where uplink transmissions within the one or more angular constraints are to use the first value of the first emission limit and uplink transmissions outside of the one or more angular constraints are to use the second value of the first emission limit. In some examples of the method, apparatuses, and non-transitory computer-readable medium described herein, the first value of the first emission limit is used when one or more of a location or an orientation of the UE may be unknown.

Some examples of the method, apparatuses, and non-transitory computer-readable medium described herein may further include operations, features, means, or instructions for transmitting an indication of one or more of an altitude or a position of the UE to the base station, and where the indication of the one or more emission limits is received from the base station responsive to the altitude or the position of the UE. In some examples of the method, apparatuses, and non-transitory computer-readable medium described herein, the indication of the one or more emission limits are received in a control information communication from the base station.

Some examples of the method, apparatuses, and non-transitory computer-readable medium described herein may further include operations, features, means, or instructions for transmitting an indication of an additional UE capability to the base station that indicates that the UE has the first device type, and where the indication of the one or more emission limits for the first frequency band is transmitted by the base station to UEs that provide the additional UE capability that indicates the first device type. Some examples of the method, apparatuses, and non-transitory computer-readable medium described herein may further include operations, features, means, or instructions for receiving an indication of access class barring that indicates UEs having the first device type are not accepted at a base station.

Some examples of the method, apparatuses, and non-transitory computer-readable medium described herein may further include operations, features, means, or instructions for receiving a reference signal associated with a victim device, and where the first value of the first emission limit is used for uplink transmissions when a signal strength of the received reference signal is at or above a threshold value, and the second value of the first emission limit is used for uplink transmissions when the signal strength of the received reference signal is below the threshold value.

A method of wireless communication at a base station is described. The method may include transmitting an indication of one or more emission limits for at least a first frequency band, where at least a first emission limit has a first value that is associated with a first UE device type and a second value that is associated with a second UE device type and receiving one or more uplink transmissions from at least a first UE that have a transmission power that is based on the first value of the first emission limit.

An apparatus for wireless communication at a base station is described. The apparatus may include a processor, memory coupled to the processor, and instructions stored in the memory. The instructions may be executable by the processor to cause the apparatus to transmit an indication of one or more emission limits for at least a first frequency band, where at least a first emission limit has a first value that is associated with a first UE device type and a second value that is associated with a second UE device type and receive one or more uplink transmissions from at least a first UE that have a transmission power that is based on the first value of the first emission limit.

Another apparatus for wireless communication at a base station is described. The apparatus may include means for transmitting an indication of one or more emission limits for at least a first frequency band, where at least a first emission limit has a first value that is associated with a first UE device type and a second value that is associated with a second UE device type and receiving one or more uplink transmissions from at least a first UE that have a transmission power that is based on the first value of the first emission limit.

A non-transitory computer-readable medium storing code for wireless communication at a base station is described. The code may include instructions executable by a processor to transmit an indication of one or more emission limits for at least a first frequency band, where at least a first emission limit has a first value that is associated with a first UE device type and a second value that is associated with a second UE device type and receive one or more uplink transmissions from at least a first UE that have a transmission power that is based on the first value of the first emission limit.

In some examples of the method, apparatuses, and non-transitory computer-readable medium described herein, the first UE device type corresponds to UEs that is capable of airborne operations, and the second UE device type corresponds to terrestrial UEs. In some examples of the method, apparatuses, and non-transitory computer-readable medium described herein, the indication of the one or more emission limits further provides a status associated with the first value and the second value of the first emission limit, and where an aerial status is associated with the first value and a grounded status is associated with the second value.

In some examples of the method, apparatuses, and non-transitory computer-readable medium described herein, the aerial status is based on an altitude of a UE, and where the first value of the first emission limit is applied to the one or more uplink transmissions when the altitude of the first UE is at or above a height threshold and the second value of the first emission limit is applied to the one or more uplink transmissions when the altitude of the first UE is less than the height threshold. In some examples of the method, apparatuses, and non-transitory computer-readable medium described herein, the indication of the one or more emission limits may be provided in a broadcast transmission from the base station. In some examples of the method, apparatuses, and non-transitory computer-readable medium described herein, the broadcast transmission from the base station includes a system information block transmission that indicates a list of emission limits for the first frequency band.

Some examples of the method, apparatuses, and non-transitory computer-readable medium described herein may further include operations, features, means, or instructions for receiving an indication of the first device type from the first UE. In some examples of the method, apparatuses, and non-transitory computer-readable medium described herein, the indication of one or more emission limits may be transmitted to the first UE responsive to the received indication of the first device type, via one or more of RRC signaling, a MAC-CE, or any combinations thereof.

Some examples of the method, apparatuses, and non-transitory computer-readable medium described herein may further include operations, features, means, or instructions for transmitting geofencing parameters with the indication of the one or more emission limits, where the geofencing parameters indicate one or more locations at which the first value of the first emission limit applies to UEs having the first UE device type, and where the second value of the first emission limit applies to UEs having the first UE device type that are outside of the one or more locations indicated by the geofencing parameters. In some examples of the method, apparatuses, and non-transitory computer-readable medium described herein, the geofencing parameters indicate one or more of an area in which the first value of the first emission limit is to be used, an altitude above which the first value of the first emission limit is to be used, vertices of a polyhedron within which the first value of the first emission limit is to be used, a center and radius of a sphere within which the first value of the first emission limit is to be used, or any combinations thereof. In some examples of the method, apparatuses, and non-transitory computer-readable medium described herein, the first value of the first emission limit may be used for all uplink transmissions when UE position information is unavailable.

In some examples of the method, apparatuses, and non-transitory computer-readable medium described herein, a power backoff for the one or more uplink transmissions may be determined based on the first emission limit and applied as an additional maximum power reduction. Some examples of the method, apparatuses, and non-transitory computer-readable medium described herein may further include operations, features, means, or instructions for receiving an indication from the first UE that the first value of the first emission limit is being used at the first UE for the one or more uplink transmissions. In some examples of the method, apparatuses, and non-transitory computer-readable medium described herein, the indication may be provided in one or more of a RRC signaling message or a MAC-CE that explicitly indicates the first value of the first emission limit may be being used. In some examples of the method, apparatuses, and non-transitory computer-readable medium described herein, the indication may be provided in a power headroom report that may be transmitted to the base station that implicitly indicates based on a reported power headroom value that the first value of the first emission limit is being used.

In some examples of the method, apparatuses, and non-transitory computer-readable medium described herein, the indication of the one or more emission limits further provide a victim location associated with the first value of the first emission limit, and where the second value of the first emission limit is applied to uplink transmissions when a directional antenna pattern of the first UE is oriented away from the victim location, and the first value of the first emission limit is applied to uplink transmissions when the directional antenna pattern is oriented toward the victim location.

In some examples of the method, apparatuses, and non-transitory computer-readable medium described herein, the indication of one or more emission limits provides an indication of a first subset of transmission beams that are associated with the first value of the first emission limit, and where a second subset of transmission beams are associated with the second value of the first emission limit. In some examples of the method, apparatuses, and non-transitory computer-readable medium described herein, the indication of one or more emission limits includes one or more angular constraints that are associated with the first value of the first emission limit, and where uplink transmissions within the one or more angular constraints are to use the first value of the first emission limit and uplink transmissions outside of the one or more angular constraints are to use the second value of the first emission limit.

Some examples of the method, apparatuses, and non-transitory computer-readable medium described herein may further include operations, features, means, or instructions for receiving an indication of one or more of an altitude or a position of the first UE, and where the indication of the one or more emission limits is transmitted responsive to the altitude or the position of the UE. Some examples of the method, apparatuses, and non-transitory computer-readable medium described herein may further include operations, features, means, or instructions for receiving an indication of an additional UE capability from the first UE that indicates the first device type, and where the indication of the one or more emission limits for the first frequency band is transmitted to UEs that provide the additional UE capability that indicates the first device type.

Some examples of the method, apparatuses, and non-transitory computer-readable medium described herein may further include operations, features, means, or instructions for transmitting an indication of access class barring that indicates UEs having the first device type are not accepted at the base station.

A method of wireless communication at a UE is described. The method may include receiving, from a base station, an indication of one or more emission limits for at least a first frequency band, where at least a first emission limit has a first value that is associated with a first UE status and a second value that is associated with a second UE status, determining to apply the first value of the first emission limit to one or more uplink transmissions of the UE based on the UE having the first UE status, and transmitting the one or more uplink transmissions from the UE based on the first value of the first emission limit.

An apparatus for wireless communication at a UE is described. The apparatus may include a processor, memory coupled to the processor, and instructions stored in the memory. The instructions may be executable by the processor to cause the apparatus to receive, from a base station, an indication of one or more emission limits for at least a first frequency band, where at least a first emission limit has a first value that is associated with a first UE status and a second value that is associated with a second UE status, determine to apply the first value of the first emission limit to one or more uplink transmissions of the UE based on the UE having the first UE status, and transmit the one or more uplink transmissions from the UE based on the first value of the first emission limit.

Another apparatus for wireless communication at a UE is described. The apparatus may include means for receiving, from a base station, an indication of one or more emission limits for at least a first frequency band, where at least a first emission limit has a first value that is associated with a first UE status and a second value that is associated with a second UE status, determining to apply the first value of the first emission limit to one or more uplink transmissions of the UE based on the UE having the first UE status, and transmitting the one or more uplink transmissions from the UE based on the first value of the first emission limit.

A non-transitory computer-readable medium storing code for wireless communication at a UE is described. The code may include instructions executable by a processor to receive, from a base station, an indication of one or more emission limits for at least a first frequency band, where at least a first emission limit has a first value that is associated with a first UE status and a second value that is associated with a second UE status, determine to apply the first value of the first emission limit to one or more uplink transmissions of the UE based on the UE having the first UE status, and transmit the one or more uplink transmissions from the UE based on the first value of the first emission limit.

In some examples of the method, apparatuses, and non-transitory computer-readable medium described herein, the first UE status corresponds to an airborne status and the second UE status corresponds to a grounded status. In some examples of the method, apparatuses, and non-transitory computer-readable medium described herein, the indication of the one or more emission limits further indicates that the first emission limit is applied to UEs having an aerial UE device type. In some examples of the method, apparatuses, and non-transitory computer-readable medium described herein, the status of the UE is based on an altitude of the UE, and where the first value of the first emission limit is applied to the one or more uplink transmissions when the altitude of the UE is at or above a height threshold and the second value of the first emission limit is applied to the one or more uplink transmissions when the altitude of the UE is less than the height threshold.

Some examples of the method, apparatuses, and non-transitory computer-readable medium described herein may further include operations, features, means, or instructions for receiving, from the base station, geofencing parameters that indicate one or more locations at which the first value of the first emission limit applies, and where the second value of the first emission limit applies to UEs outside of the locations indicated by the geofencing parameters. Some examples of the method, apparatuses, and non-transitory computer-readable medium described herein may further include operations, features, means, or instructions for determining that a position of the UE is within an area indicated by the geofencing parameters, and where the first value of the first emission limit is applied to at least a first uplink transmission of the UE based on the UE being within the area indicated by the geofencing parameters, determining, after transmitting the first uplink transmission, that a subsequent position of the UE is outside of the area indicated by the geofencing parameters, and transmitting, based on the subsequent position of the UE, at least a second uplink transmission using the second value of the first emission limit.

A method of wireless communication at a base station is described. The method may include transmitting an indication of one or more emission limits for at least a first frequency band, where at least a first emission limit has a first value that is associated with a first UE status, and a second value that is associated with a second UE status and receiving one or more uplink transmissions from at least a first UE that have a transmission power that is based on the first value of the first emission limit.

An apparatus for wireless communication at a base station is described. The apparatus may include a processor, memory coupled to the processor, and instructions stored in the memory. The instructions may be executable by the processor to cause the apparatus to transmit an indication of one or more emission limits for at least a first frequency band, where at least a first emission limit has a first value that is associated with a first UE status, and a second value that is associated with a second UE status and receive one or more uplink transmissions from at least a first UE that have a transmission power that is based on the first value of the first emission limit.

Another apparatus for wireless communication at a base station is described. The apparatus may include means for transmitting an indication of one or more emission limits for at least a first frequency band, where at least a first emission limit has a first value that is associated with a first UE status, and a second value that is associated with a second UE status and receiving one or more uplink transmissions from at least a first UE that have a transmission power that is based on the first value of the first emission limit.

A non-transitory computer-readable medium storing code for wireless communication at a base station is described. The code may include instructions executable by a processor to transmit an indication of one or more emission limits for at least a first frequency band, where at least a first emission limit has a first value that is associated with a first UE status, and a second value that is associated with a second UE status and receive one or more uplink transmissions from at least a first UE that have a transmission power that is based on the first value of the first emission limit.

In some examples of the method, apparatuses, and non-transitory computer-readable medium described herein, the first UE status corresponds to an airborne status and the second UE status corresponds to a grounded status. In some examples of the method, apparatuses, and non-transitory computer-readable medium described herein, the indication of the one or more emission limits further indicates that the first emission limit is applied to UEs having an aerial UE device type.

In some examples of the method, apparatuses, and non-transitory computer-readable medium described herein, the status of the UE is based on an altitude of the UE, and where the first value of the first emission limit is applied to the one or more uplink transmissions when the altitude of the UE is at or above a height threshold and the second value of the first emission limit is applied to the one or more uplink transmissions when the altitude of the UE is less than the height threshold. Some examples of the method, apparatuses, and non-transitory computer-readable medium described herein may further include operations, features, means, or instructions for transmitting geofencing parameters that indicate one or more locations at which the first value of the first emission limit applies, and where the second value of the first emission limit applies to UEs outside of the locations indicated by the geofencing parameters.

DETAILED DESCRIPTION

Figure 1:
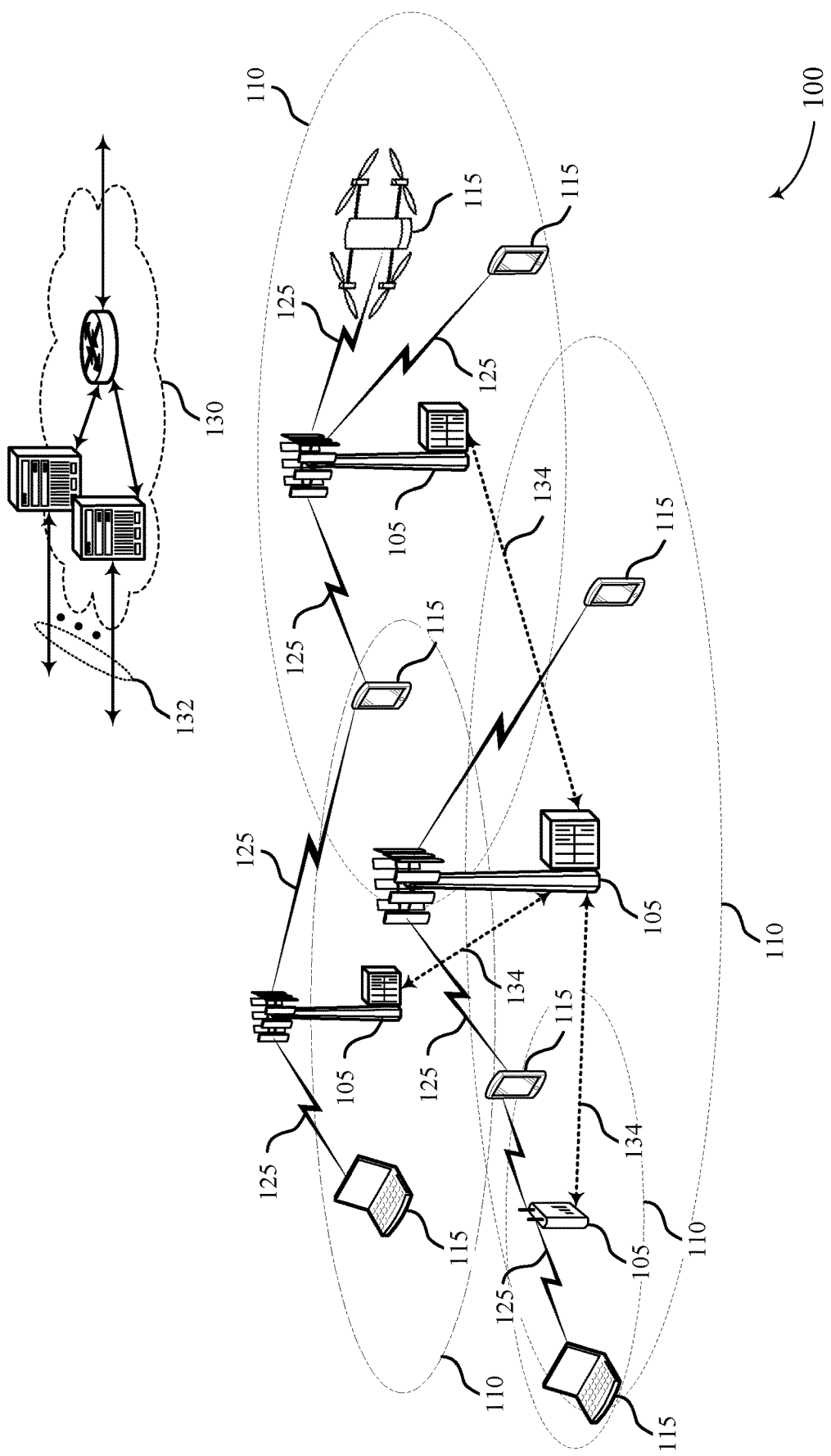
FIG. 1 illustrates an example of a system for wireless communications that supports emission limit indication techniques for aerial wireless devices in accordance with aspects of the present disclosure.

In some deployments, a user equipment (UE) may communicate with a base station using an assigned channel bandwidth in one or more frequency bands. For example, a base station and UE may communicate using a first frequency band, and other nearby devices (e.g., wireless transmitters/receivers) that use an adjacent frequency band may be impacted by out of band (OOB) emissions from the base station or UEs. In order to reduce such potential interference, one or more emission limits may be provided (e.g., on a per-frequency band basis) that may cause a base station or UE to reduce a transmission power in order to mitigate potential interference. In such cases, reduction of transmission power may result in reduced efficiency or reliability of the communications between the UE and base station (e.g., due to a different modulation and coding scheme (MCS) and/or different repetition levels of the reduced power transmissions, reduced likelihood of successful receipt of the reduced power transmissions, etc.). In some examples, OOB emissions may be characterized as unwanted emissions immediately outside the assigned channel bandwidth and may result from the modulation process and non-linearity in the transmitter, for example. In some cases, OOB emissions may have defined limits, which may be identified by an OOB emission mask. Further, in some cases, a frequency band may have additional OOB emission limits (e.g., when radio frequency devices in adjacent frequencies may be sensitive to OOB emissions). Such additional OOB spectrum emission limits may be signaled by a base station to indicate that the UE is to meet an additional requirement or guideline for a specific deployment scenario (e.g., in an additionalSpectrumEmission indication provided as part of a cell handover or in a broadcast message that indicates an additional emission mask). For example, if a particular base station is aware that a sensitive radio frequency device (e.g., a radio detection and ranging (RADAR) installation or satellite tracking station) is located within or in proximity to a coverage area of the base station, the base station may signal additional OOB spectrum emission limits for a frequency band (e.g., a frequency band from a defined frequency band list) to limit such OOB emissions and mitigate potential interference from OOB emissions. Such sensitive radio frequency devices may be referred to as victim devices.

In some cases, the additional OOB spectrum emission limits may be provided in one or more predefined tables (e.g., a predefined table that is indicated by a network signaled (NS) value provided in radio resource control (RRC) signaling or in a broadcast transmission (e.g., in a system information block (SIB), such as SIB2)). To meet the emission limits at a UE, additional maximum power reduction (A-MPR) may be applied to a maximum output power (e.g., a maximum output power that is defined for a frequency band). In cases where additional emission limits do not apply, an A-MPR of 0 dB may be used at the UE. Thus, the output power value of a UE may be limited by one or more emissions masks, which may be used to mitigate OOB emissions as well as other various parameters associated with interference, such as adjacent channel leakage ratio (ACLR), spectrum emission mask (SEM), error vector magnitude (EVM), or in-band emissions (IBEs).

In some current deployments, a frequency band (e.g., a numbered frequency band in a frequency band list) may have a set of OOB emission limits, and UEs that are signaled to apply the OOB emission limits may apply the associated emission mask. Further, the UEs that are signaled to apply such emission masks may be UEs that are located in a proximity of a victim device. However, in cases where a UE may be an aerial UE, such as an unmanned aerial vehicle (UAV) or drone, the UE may operate at altitudes that provide a longer line of sight to a victim device which may result in OOB emissions that occur at greater distances than those of lower-elevation UEs, which may be referred to as grounded UEs. The increased line of sight probability may increase the interference seen by victim devices. Thus, in order to accommodate aerial-capable UEs, additional emission masks may be applied at further distances from victim devices.

Various techniques provided herein allow for such additional emission masks to be applied to some UEs, such as aerial-capable UEs, and not to other UEs, such that non-aerial-capable UEs, that may operate without the additional emission limits. Further, in some cases, such additional emission masks may be applied based on a status of the UE, such as if the UE is above a height threshold, if the UE is within a geofenced region, if an emission direction of the UE is in a particular direction, or any combinations thereof. In some cases, a base station may signal one or more emission limits for one or more different frequency bands, in which two or more values for one of the emission limits may be provided. For example, a first frequency band may have a first emission limit that has a first value that is to be applied to a first subset of UEs (e.g., aerial-capable UEs) and a second value that is to be applied to a second subset of UEs (e.g., non-aerial-capable UEs). Thus, different UEs communicating using the first frequency band may have different emission limits.

Such techniques may allow for the application of additional emission limits for UEs that are likely to generate emissions that interfere with a victim device, while UEs that are less likely to generate emissions that interfere with the victim device may not have the additional emission limits. Such techniques may allow for more efficient network operation by allowing UEs that are not likely to cause OOB interference to have more flexibility for setting transmission power and to transmit at higher powers which may allow, for example, higher coding rates, reduced numbers of repetitions or retransmissions, or combinations thereof. Further, higher power transmissions may allow for a higher likelihood of successful transmissions.

Aspects of the disclosure are initially described in the context of a wireless communications system. Various examples of UE types and statuses associated with different emission limits are then described. Aspects of the disclosure are further illustrated by and described with reference to apparatus diagrams, system diagrams, and flowcharts that relate to emission limit indication techniques for aerial wireless devices.

FIG. 1 illustrates an example of a wireless communications system 100 that supports emission limit indication techniques for aerial wireless devices in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support high-priority or critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, base stations 105 may provide emission limits for one or more frequency bands in which the base station 105 and one or more UEs 115 may operate. Such emission limits may be provided to help reduce interference at other nearby devices. For example, a base station 105 and UE 115 may communicate using a first frequency band, and other nearby devices (e.g., wireless transmitters/receivers) that use an adjacent frequency band may be impacted by 00B emissions from the base station 105 or UEs 115. In order to reduce such potential interference, one or more emission limits may be provided (e.g., on a per-frequency band basis) that may cause a base station 105 or UE 115 to reduce a transmission power in order to mitigate potential interference. In such cases, reduction of transmission power may result in reduced efficiency or reliability of the communications between the UE 115 and base station 105 (e.g., due to a different MCS and/or different repetition levels of the reduced power transmissions, reduced likelihood of successful receipt of the reduced power transmissions, etc.). Efficient techniques for managing such emission limits may be beneficial in order to enhance network efficiency, reliability, or both.

In some examples of the present disclosure, a base station 105 may signal one or more emission limits for one or more different frequency bands, in which two or more values for one of the emission limits may be provided. For example, a first frequency band may have a first emission limit that has a first value that is to be applied to a first subset of UEs 115 and a second value that is to be applied to a second subset of UEs 115. Thus, different UEs 115 communicating using the first frequency band may have different emission limits. In some cases, the first subset of UEs 115 may be capable of aerial operations (e.g., UAVs or drones) and may use the first value of the first emission limit, and the second subset of UEs 115 may be incapable of or unintended for aerial operations (e.g., handheld UEs, UEs incorporated in land-based equipment or vehicles, other terrestrial UEs, etc.) and may use the second value of the first emission limit. In some cases, a UE 115 status (e.g., an altitude or position) or transmission directivity may be used to determine if the UE 115 is to apply the first value or the second value for an emission limit of a frequency band.

Figure 2:
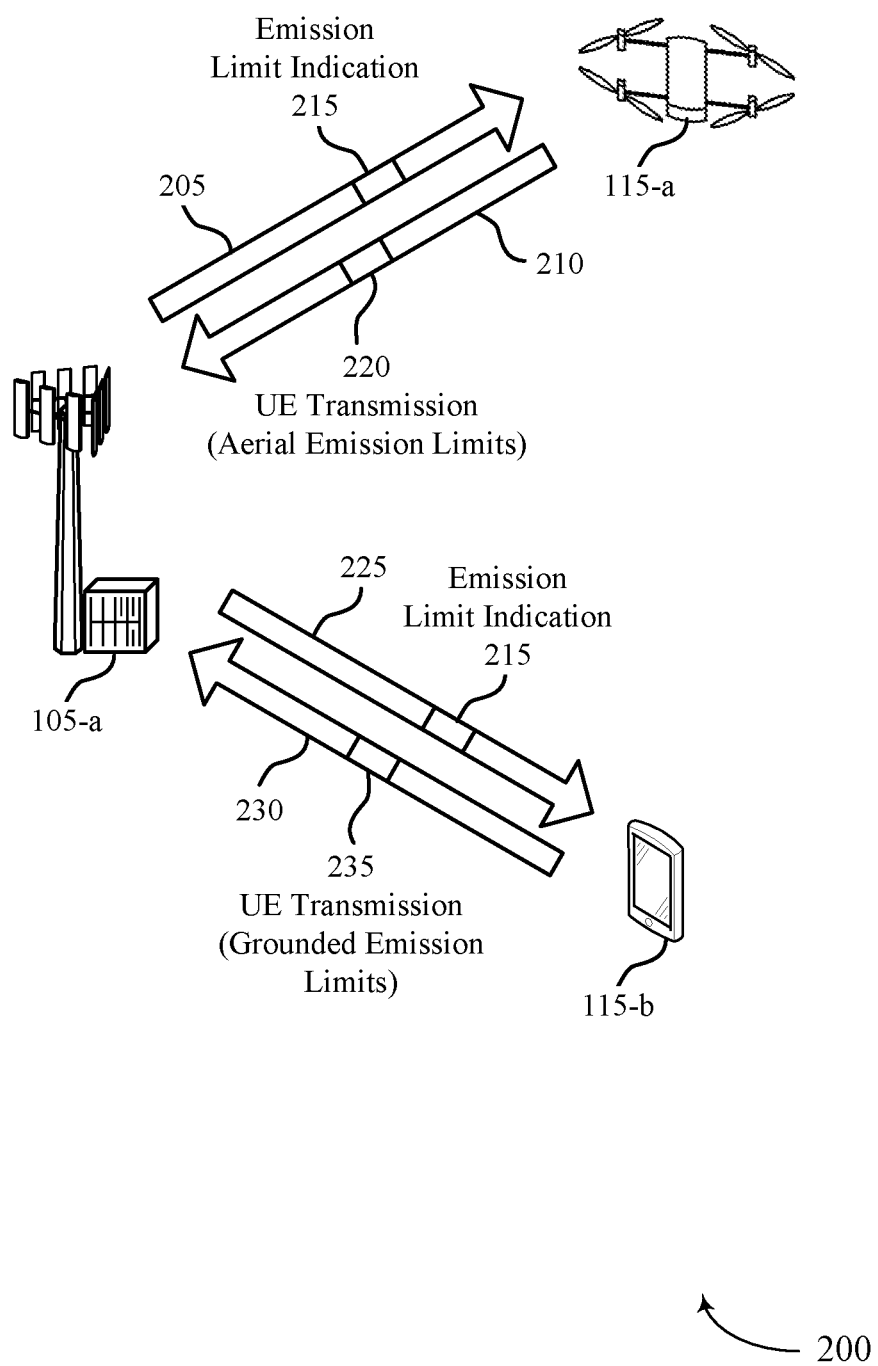
FIGS. 2 through 5 illustrate examples of portions of wireless communications systems that support emission limit indication techniques for aerial wireless devices in accordance with aspects of the present disclosure.

FIG. 2 illustrates an example of a wireless communications system 200 that supports emission limit indication techniques for aerial wireless devices in accordance with aspects of the present disclosure. In some examples, wireless communications system 200 may implement aspects of wireless communications system 100. The wireless communications system 200 may include a first UE 115-a, a second UE 115-b, and a base station 105-a, which may be respective examples of UEs 115 and base stations 105 as described herein. Base station 105-a may transmit to first UE 115-a on a first downlink carrier 205, and first UE 115-a may transmit to base station 105-a on a first uplink carrier 210. Likewise, the base station 105-a may transmit to second UE 115-b on a second downlink carrier 225, and second UE 115-b may transmit to base station 105-a on a second uplink carrier 230.

In this example, the base station 105-a may transmit an emission limit indication 215 to the first UE 115-a and the second UE 115-b, along with one or more other UEs that may be present in a coverage area of the base station 105-a. The emission limit indication 215 may be transmitted, for example, in a broadcast transmission of the base station 105-a such as a SIB (e.g., in SIB2). In other cases, the emission limit indication 215 may be provided in other types of signaling, such as in RRC signaling, in downlink control information (DCI), in a MAC control element (MAC-CE), or any combination thereof. In some cases, the emission limit indication 215 may include OOB emission masks for one or more frequency ranges over which the base station 105-a and UEs 115 may communicate. Further, the emission limit indication 215 may provide, for one or more of the frequency ranges, an emission limit that has multiple different values, in which one of the multiple different values is selected for a UE 115 based on a UE type, a UE status, or combinations thereof. Based on the selected value for the emission limit, the first UE 115-a may transmit a UE transmission 220 based on a first value of the emission limit, and the second UE 115-a may transmit UE transmissions 235 based on a second value of the emission limit.

In this example, the first UE 115-a may be an aerial UE that is capable of wireless communications with base station 105-a while the first UE 115-a is flying. In some cases, the first UE 115-a may optionally signal a first UE type indication associated with an aerial UE to the base station 105-a (e.g., as a device type indication or UE capability indication). Based on the aerial UE device type, the first UE 115-a may determine that the first value of the emission limit is to be applied to UE transmission 220. For example, the first UE 115-a and second UE 115-b may use a first frequency band of 1710-1785 MHz (i.e., the n3 band) for uplink communications with the base station 105-a. Further, a victim device may be a satellite communications earth station (e.g., a Meteorological Satellite (MetSat) earth station) may receive satellite communications using a frequency band of 1670-1710 MHz. Thus, in order to prevent unwanted OOB emissions of the UEs 115, an emission limit may be applied to UE 115 transmissions in the first frequency band (e.g., −30 dBm/MHz or −40 dBm/MHz). In some cases, such OOB emissions may be limited for transmitters that are located at a higher altitude than the victim device while not being limited for transmitters that are located at a same or lower altitude than the victim device, as OOB emissions of lower altitude devices may not cause significant interference at the victim device. Thus, the first value of the emission limit for this frequency band may be used at the first UE 115-*a* based on the aerial UE device type, and the second value of the emission limit (e.g., that does not have an additional OOB emission mask) may be used at the second UE 115-*b* based on the non-aerial device type of the second UE 115-*b*.

In some cases, the first value of the emission limit may be applied to all UEs 115 that have a first UE device type (e.g., to all aerial UEs), and the second value of the emission limit may be applied to other UEs. In other cases, it is recognized that even an aerial UE such as first UE 115-*a* may transmit uplink transmissions while not flying, in which case the first UE 115-*a* may have OOB emissions that are the same as non-aerial second UE 115-*b*. Thus, in some cases, a UE status may also be used to determine which value of the emission limit to apply. An example of a height threshold for applying different values of emission limits is discussed in more detail with reference to FIG. 3. In other cases, geofencing techniques may be used to determine UE status and whether to apply different values of emission limits, such that if the first UE 115-*a* has a position within a geofenced region associated with a victim device the first value of the emission limit may be applied, and otherwise the second value of the emission limit is applied. An example of a geofenced space associated with a victim device is described in more detail with reference to FIG. 4. Further, in some cases, the first UE 115-*a* may use directive transmissions, such as through a directive antenna panel or beamforming techniques, and a directivity of UE emissions may be used as a status for determining whether to apply the first value or second value of the emission limit. An example of a directive transmission relative to a victim device is described in more detail with reference to FIG. 5.

Accordingly, various techniques as discussed herein provide for application of emission masks based on a UE device type, UE status, or both. In some cases, the applicable UE device type can be determined by the UE, such as through pre-programming of the UE depending upon the application in which the UE is used. In other cases, the UE device type may be provided by the base station 105-*a* upon registration (e.g., the base station 105-*a* may determine based on an International Mobile Equipment Identity (IMEI) whether a UE is an aerial device or has another device type to which an additional emission mask is to be applied). In some cases, the base station 105-*a* may indicate emission masks to be applied at a UE 115 upon RRC configuration or reconfiguration (e.g., the base station 105-*a* may provide a value of a NS corresponding to an additional emission mask). In some cases, the different values of emission limits for a frequency band may be provided through a separate emission mask (e.g., a lookup table) that is signaled by the base station 105-*a*. In other cases, the different values of emission limits for a frequency band may be provided based on an offset value of an emission mask associated with the frequency band. Additionally or alternatively, the base station 105-*a* may indicate additional emission requirements or guidelines based on a UE status (e.g., for when the first UE 115-*a* is aerial or grounded, inside or outside of a geofenced space, etc.).

Figure 3:
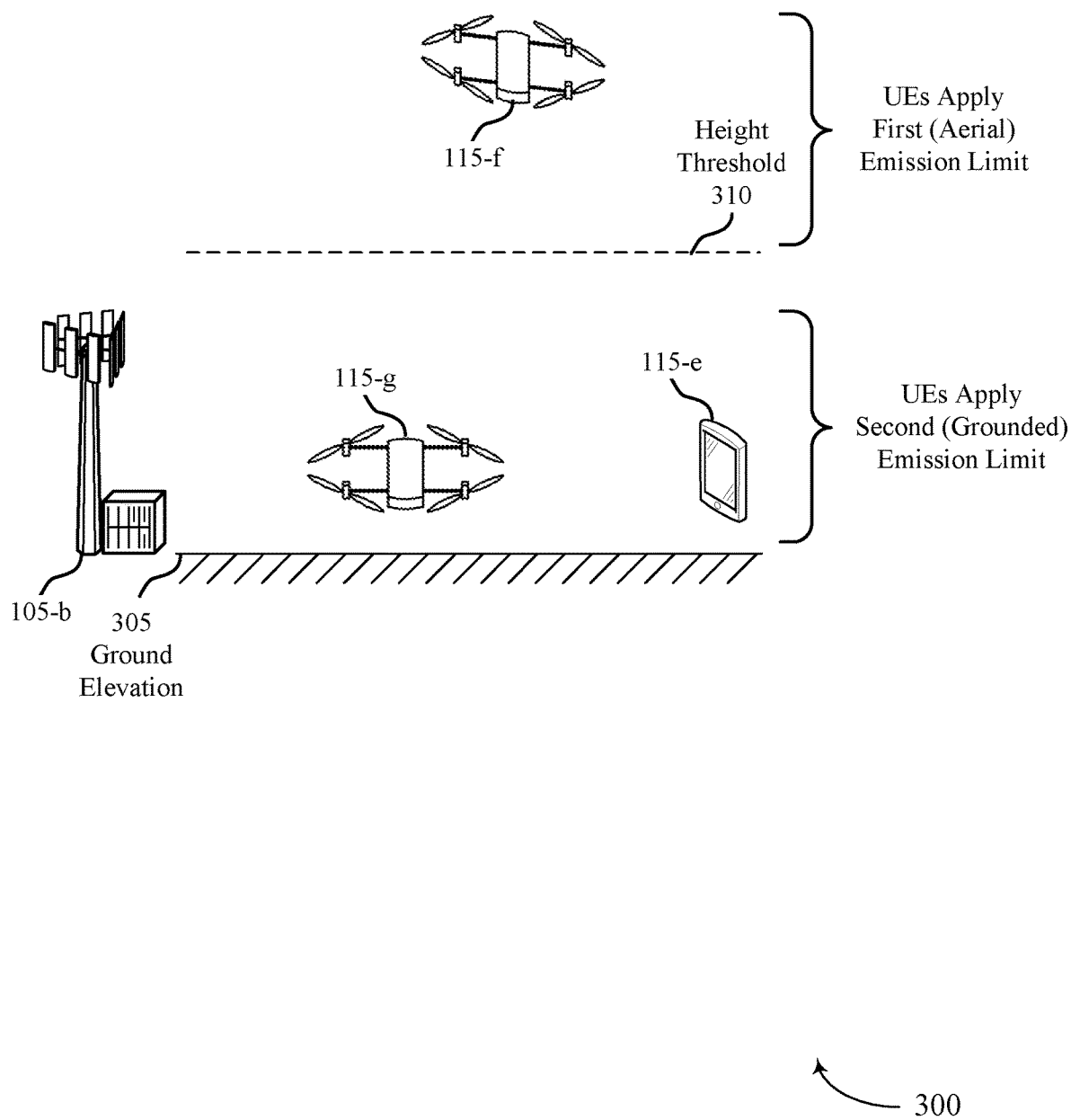

In some cases, the first UE 115-*a* may change state after some initial communications with the base station 105-*a*. For example, the first UE 115-*a* may establish a connection with the base station 105-*a* while the first UE 115-*a* is grounded, and the second value of the emission limit may be selected for uplink communications. Then, the first UE 115-*a* may take off, which may necessitate a change to the first value of the emission limit. When applying the first value of the emission limit, the first UE 115-*a* may apply a power backoff (e.g., an A-MPR) to its uplink transmissions. In order to provide the base station 105-*a* with current information for purposes of resource allocations and scheduling, in some cases the first UE 115-*a* may transmit an indication of the change of state to the base station 105-*a*. In some cases, the indication of the change of state may be provided in explicit signaling from the first UE 115-*a*. For example, upon entering a restricted area or going above a threshold height, the first UE 115-*a* may transmit a message to the base station 105-*a* (e.g., via RRC signaling or a MAC-CE) informing of the change in maximum power that is available for uplink transmissions. In other cases, the first UE 115-*a* may transmit implicit signaling of the change, such as through a power headroom report (PHR) that indicates a reduced or negative power headroom, that may be interpreted by the base station 105-*a* to indicate that the additional emission mask is being applied. The UE 115-*a* may use this information for scheduling (e.g., to provide sufficient resources and an MCS that is suitable for the reduced power transmissions of the first UE 115-*a*). As indicated above, in some cases such a change of state may occur when the first UE 115-*a* exceeds a height threshold. FIG. 3 illustrates an example of such a height threshold.

FIG. 3 illustrates an example of a wireless communications system 300 that supports emission limit indication techniques for aerial wireless devices in accordance with aspects of the present disclosure. In some examples, wireless communications system 300 may implement aspects of wireless communications system 100 or 200. The wireless communications system 300 may include a first UE 115-*e*, a second UE 115-*f*, a third UE 115-*g*, and a base station 105-*b*, which may be respective examples of UEs 115 and base stations 105 as described herein.

In this example, the base station 105-*b* may identify a ground elevation 305 (e.g., an elevation associated with a victim device), and may determine a height threshold 310 for application of the additional emission mask. In some cases, the base station 105-*b* may transmit in indication of the height threshold 310 to the UEs 115 (e.g., via broadcast signaling, RRC signaling, a MAC-CE, etc.). Such a height threshold 310 may be provided as an altitude above sea level (e.g., a number of feet or meters above sea level as which an additional emission mask is to be applied), that may take into account an elevation of the victim device and a height above which OOB emissions of a UE 115 are to be limited. In other cases, the height threshold 310 may be a preprogrammed threshold, and the base station 105-*b* may indicate that the height threshold 310 is to be used and may indicate a position or elevation of the victim device, and the UEs 115 may determine to apply the additional emission mask based on this information and the current status of the UE 115 altitude. Further, in some cases, the height threshold 310 may be variable based on a distance between the UE 115 and victim device (e.g., the height threshold 310 may increase closer to the victim device and decrease farther away from the victim device).

In the example of FIG. 3, the first UE 115-*e* and the third UE 115-*g* may be below the height threshold 310, and thus may apply a second value of the emission limit, corresponding to an emission limit for grounded UEs, while the second UE 115-*f* may be above the height threshold 310 and apply the first value of the emission limit corresponding to an emission limit for aerial UEs. Additionally, or alternatively, one or more geofencing parameters may be used to determine which emission limits are to be applied at a UE 115. An example of geofencing techniques for determining emission limits is described with reference to FIG. 4.

Figure 4:
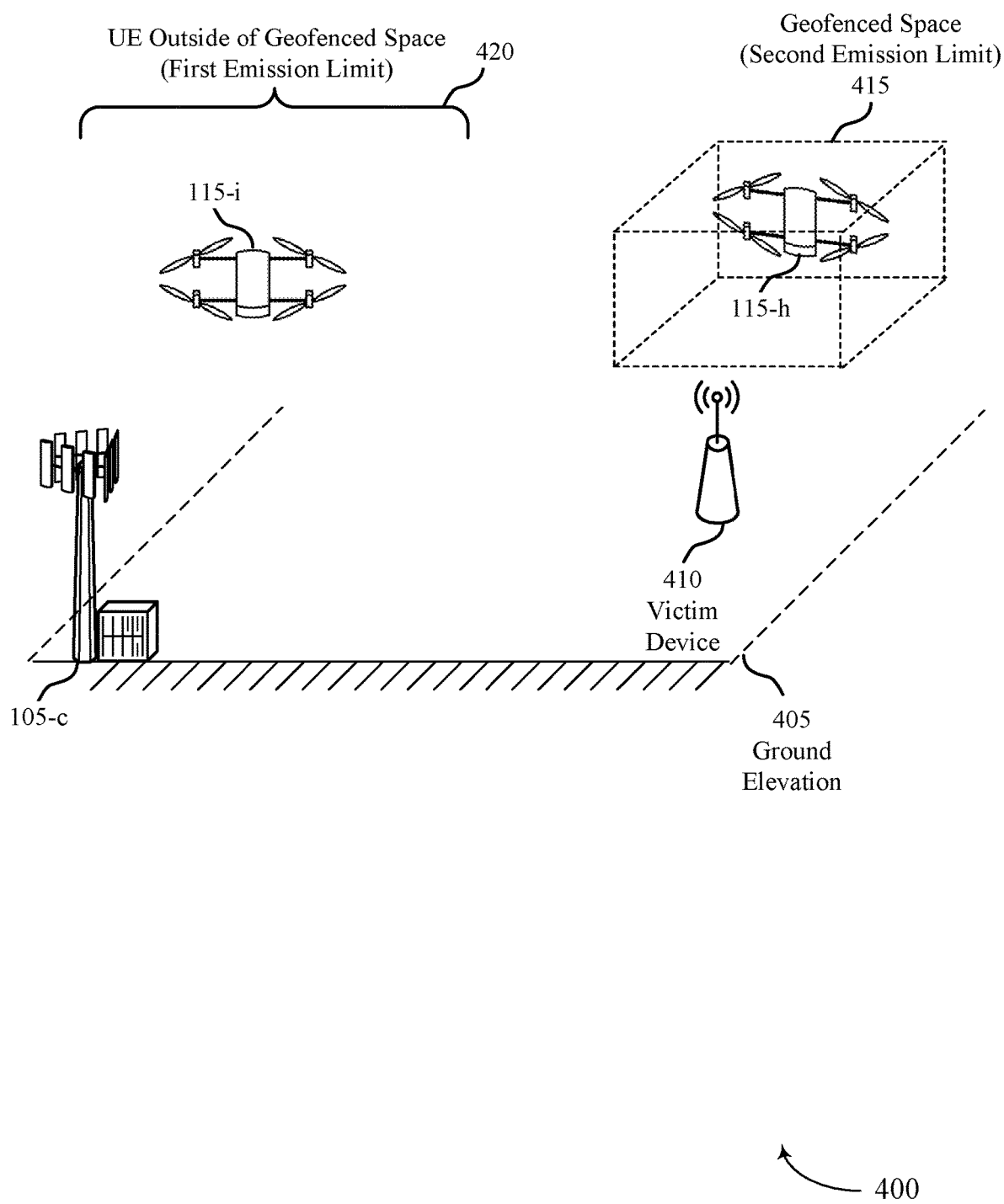

FIG. 4 illustrates an example of a wireless communications system 400 that supports emission limit indication techniques for aerial wireless devices in accordance with aspects of the present disclosure. In some examples, wireless communications system 400 may implement aspects of wireless communications system 100, 200, or 300. The wireless communications system 400 may include a first UE 115-*h*, a second UE 115-*i*, and a base station 105-*c*, which may be respective examples of UEs 115 and base stations 105 as described herein. In this example, a victim device 410 is illustrated that has an associated ground elevation 405.

In the example of FIG. 4, the base station 105-*c* may identify geofencing parameters for a geofenced space 415 that is associated with the victim device 410. For example, the geofenced space 415 may be an area or volume around the victim device 410, which may be defined by vertices of a polyhedron, a cylinder that extends up from a ground-based radius from the victim device 410 (e.g., from the ground elevation 405 or starting at a certain height threshold), a center and radius of a sphere, etc. The base station 105-*c* may indicate the geofencing parameters to the UE 115 (e.g., via broadcast signaling, RRC signaling, a MAC-CE, etc.).

In the example of FIG. 4, the first UE 115-*h* may be within the geofenced space 415, and thus may apply a second value of the emission limit, corresponding to an emission limit for aerial UEs, while the second UE 115-*i* may be at a position 420 that is outside of the geofenced space 415 and apply the first value of the emission limit corresponding to an emission limit for grounded UEs. In some cases, the first UE 115-*h* may include a global positioning system (GPS) module (and/or one or more other position determination systems) that may provide position information for the first UE 115-*h* that is used to determine whether a current location is within the geofenced space 415 or not. In some cases, if a UE 115 does not have a position determination capability or is otherwise unable to determine its position (e.g., due to an inability to receive signals used to determine position), it may be assumed that the second value of the emission limit applies. Additionally, or alternatively, in some cases directivity of UE emissions may be used to determine which emission limits are to be applied at a UE 115. An example of emission directivity techniques for determining emission limits is described with reference to FIG. 5.

Figure 5:
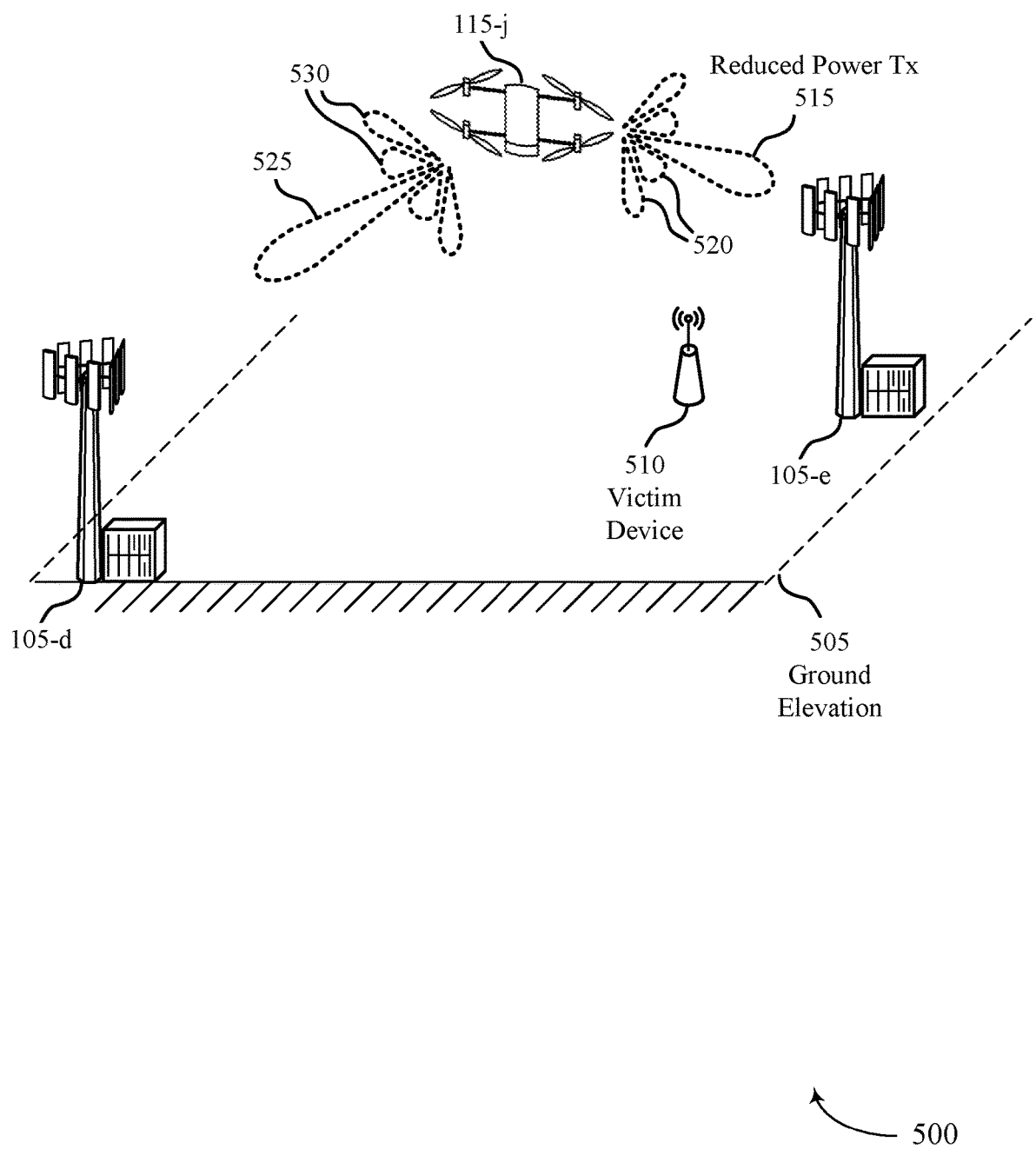

FIG. 5 illustrates an example of a wireless communications system 500 that supports emission limit indication techniques for aerial wireless devices in accordance with aspects of the present disclosure. In some examples, wireless communications system 500 may implement aspects of wireless communications system 100, 200, 300, or 400. The wireless communications system 500 may include a UE 115-*j*, a first base station 105-*d*, and a second base station 105-*e*, which may be respective examples of UEs 115 and base stations 105 as described herein. In this example, a victim device 510 is illustrated that has an associated ground elevation 505.

In the example of FIG. 5, the UE 115-*j* may have directive transmissions. In some cases, such directive transmissions may be due to a directivity of an antenna panel at the UE 115-*j*. In other cases, the UE 115-*j* may use beamforming to generate directive transmission patterns. In such cases, different emission limits may be applied based on whether the directive transmissions are pointed toward the victim device 510 or away from the victim device 510. For example, a main lobe 525 of a directive transmission may point away from the victim device (e.g., toward first base station 105-*d*) and may be transmitted without an additional emission mask. In the example of FIG. 5, OOB emissions 530 may thus not interfere with communications at the victim device 510. In other cases, a main lobe 515 of a directive transmission may be pointed toward the victim device 510 (e.g., toward second base station 105-*e* that is located in a same or similar direction from the UE 115-*j* as the victim device 510), and may be a reduced power transmission based on applying an additional emission mask. In this example, OOB emissions 520 may be reduced sufficiently to mitigate interference caused at the victim device 510.

Thus, additional emission limits may also be different for different types of antennas/radiation patterns associated with transmission from the UE 115-*j*. In some cases, in addition to the UE type or status information (e.g., height status, type of device, geofencing status, etc.) there may be an angular constraint for the emission requirements or guidelines (e.g., the emissions measured within a given area of an imaginary sphere have to be smaller than a predetermined value). In such cases, coordinates of the victim device 510 may be signaled to the UE 115-*j*, and the angles over which the emissions are to be measured. The UE 115-*j* may then determine its position and orientation and apply the corresponding emission mask to determine power backoff In cases where the UE 115-*j* does not know its location or orientation, the UE 115-*j* may apply an Effective Isotropic Radiated Power (EIRP) limit instead of a power limit (i.e., the UE assumes that the victim device 510 is in the direction of its transmission).

In some cases, one or more different combinations of emission limit indication and management techniques as discussed herein may be implemented in a wireless communications system. Further, in some cases, instead of the UE determining what emission requirements or guidelines are to be applied, a base station may indicate the emission limits to the UE (e.g., via DCI, MAC-CE). In such cases, the UE may report the height/position information to the base station (e.g., via uplink control information (UCI) or a MAC-CE), and the network may configure the additional emission limits based on the status of the UE. Additionally, UEs may report the UE device type as an additional UE capability (e.g., aerial UEs may indicate that they are capable of "additional emission requirements in band X") and the network may indicate additional emission requirements or guidelines for UEs that indicate such additional capability. Additionally or alternatively, like the emission requirements or guidelines, access class barring may also be applied based on similar rules (e.g., a base station may bar certain UEs based on UE device types, UE status, or combinations thereof). For example, aerial UEs may not be accepted in a given public land mobile network (PLMN), or devices that are flying (e.g., above a height threshold) may not be accepted, and the like.

Also, as indicated, more than one of the discussed techniques may be implemented. For example, a base station may indicate a geofencing restriction and a general restriction, and UEs that are capable of locating themselves should apply the geofencing restriction and the UEs that are not capable of locating themselves should apply the general restriction. Additionally or alternatively, the emission limits may be controlled by the relative location between UE and victim or may scale down based on relative distance. Further, in some cases, a victim device or UE may transmit a reference signal and based on a measurement of the received reference signal (e.g., a measured reference signal received power (RSRP) above a threshold) the UE may apply the additional emission mask. Additionally or alternatively, in cases where beamforming is used, a UE may adjust the transmit beamforming to meet the emission requirements or guidelines (e.g., use suboptimal beamforming but at a higher transmission power). In such cases, when choosing best beam/precoder, the UE may account for the emission requirements or guidelines.

Figure 6:
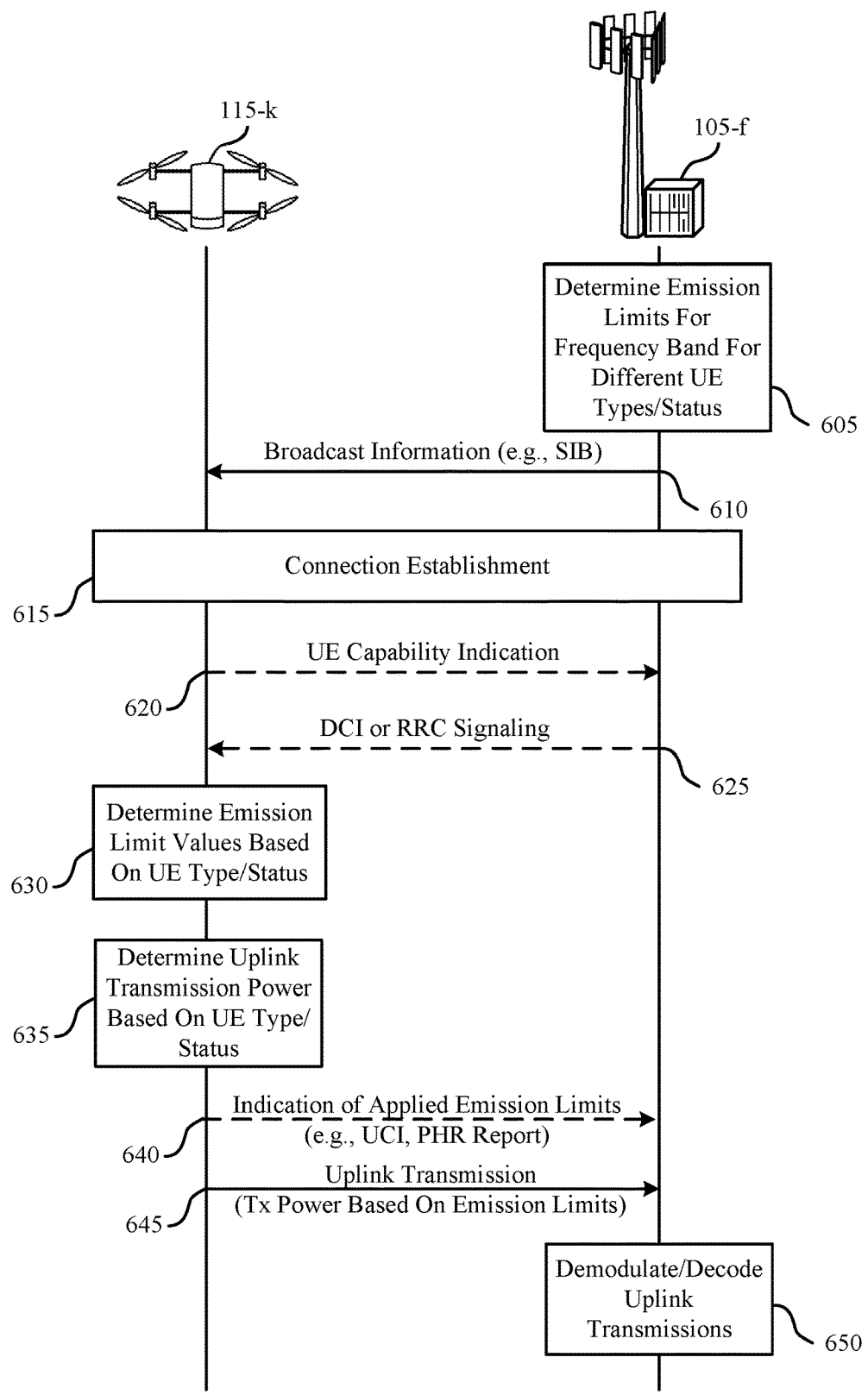
FIG. 6 illustrates an example of a process flow that supports emission limit indication techniques for aerial wireless devices in accordance with aspects of the present disclosure.

FIG. 6 illustrates an example of a process flow 600 that supports emission limit indication techniques for aerial wireless devices in accordance with aspects of the present disclosure. In some examples, process flow 600 may implement aspects of wireless communications system 100 through 500. Process flow 600 may include a base station 105-$f$ and a UE 115-$k$, which may be examples of corresponding base stations 105 and UEs 115, respectively, as described herein with reference to FIGS. 1-5. As described herein, UE 115-$k$ may be an aerial capable UE as described herein.

In the following description of the process flow 600, the operations between UE 115-$k$ and base station 105-$f$ may be transmitted in a different order than the order shown, or the operations performed by base station 105-$f$ and UE 115-$k$ may be performed in different orders or at different times. Certain operations may also be left out of the process flow 600, or other operations may be added to the process flow 600. It is to be understood that while base station 105-$f$ and UE 115-$k$ are shown performing a number of the operations of process flow 600, any wireless device may perform the operations shown.

In this example, at 605, the base station 105-$f$ may determine emission limits for one or more frequency bands for different UE types, UE statuses, or combinations thereof. In some cases, the base station 105-$f$ may determine that at least a first frequency band has an additional emission mask and may determine that the additional emission mask is to be applied for airborne UEs, such that airborne UEs apply a first value of an emission limit and non-airborne UEs apply a second value of an emission limit (e.g., no additional emission limit). In some cases, the base station 105-$f$ may determine a location of a victim device and may determine one or more parameters for applying the first value of the emission limit, such as a height threshold, geofencing parameters, area parameters, directive emission parameters, or any combinations thereof. At 610, the base station 105-$f$ may broadcast the emission limits. In some cases, the emission limits may be broadcast in a SIB.

At 615, the base station 105-$f$ and UE 115-$k$ may perform a connection establishment procedure (e.g., random access request, random access response, exchange of RRC signaling, etc.). In some cases, as part of the connection establishment, the UE 115-$k$ may provide one or more of a UE device type (e.g., aerial UE or terrestrial UE) or a UE status (e.g., airborne or grounded), and the base station 105-$f$ may provide an indication that additional emission parameters are to be applied for the first frequency band. In some cases, the base station 105-$f$ may provide an indication of an additional emission mask associated with the first frequency band that may provide the first value for the emission limit and the second value for the emission limit that are to be applied based on the UE device type or status. In some cases, the UE 115-$k$ may transmit uplink communications as part on the connection establishment procedure, and a transmit power of such uplink communications may be limited by emission limits (e.g., all uplink transmissions of a connection establishment procedure may be limited for aerial-capable UEs). In some cases, at 620, the UE 115-$k$ may optionally transmit a capability indication separately from the connection establishment procedure. Further, at 625, the base station 105-$f$ may optionally transmit DCI or RRC signaling separately from the connection establishment procedure that indicates whether the additional emission mask is to be applied and whether the first value of the emission limit or the second value of the emission limit is to be applied by the UE 115-$k$ based on the UE type/status.

At 630, the UE 115-$k$ may determine emission limit values based on the UE type/status. In some cases, the UE 115-$k$ may determine a current status, such as whether the UE 115-$k$ is above or below a height threshold, whether the UE 115-$k$ is in a geofencing space, whether the directivity of UE 115-$k$ transmissions are toward or away from a victim device, or any combinations thereof. Based on the determined status, the UE 115-$k$ may determine the emission limit values that are to be applied to uplink transmissions.

At 635, the UE 115-$k$ may determine an uplink transmission power based on the UE type/status and the determined emission limits. In cases where the first value of the emission limit is to be applied, the UE 115-$k$ may apply an A-MPR to a calculated transmission power in order to comply with the additional emission limits. In cases where the second value of the emission limit is to be applied, the UE 115-$k$ may not apply any additional power reduction. Optionally, at 640, the UE 115-$k$ may indicate to the base station 105-$f$ the applied emission limits (e.g., via UCI, a PHR, etc.).

At 645, the UE 115-$k$ may transmit uplink transmissions to the base station 105-$f$, where a transmission power of the uplink transmissions is determined based on whether or not the additional emission limits are applied to the transmission. At 650, the base station 105-$f$ may demodulate and decode the uplink transmissions of the UE 115-$k$.

Figure 7:
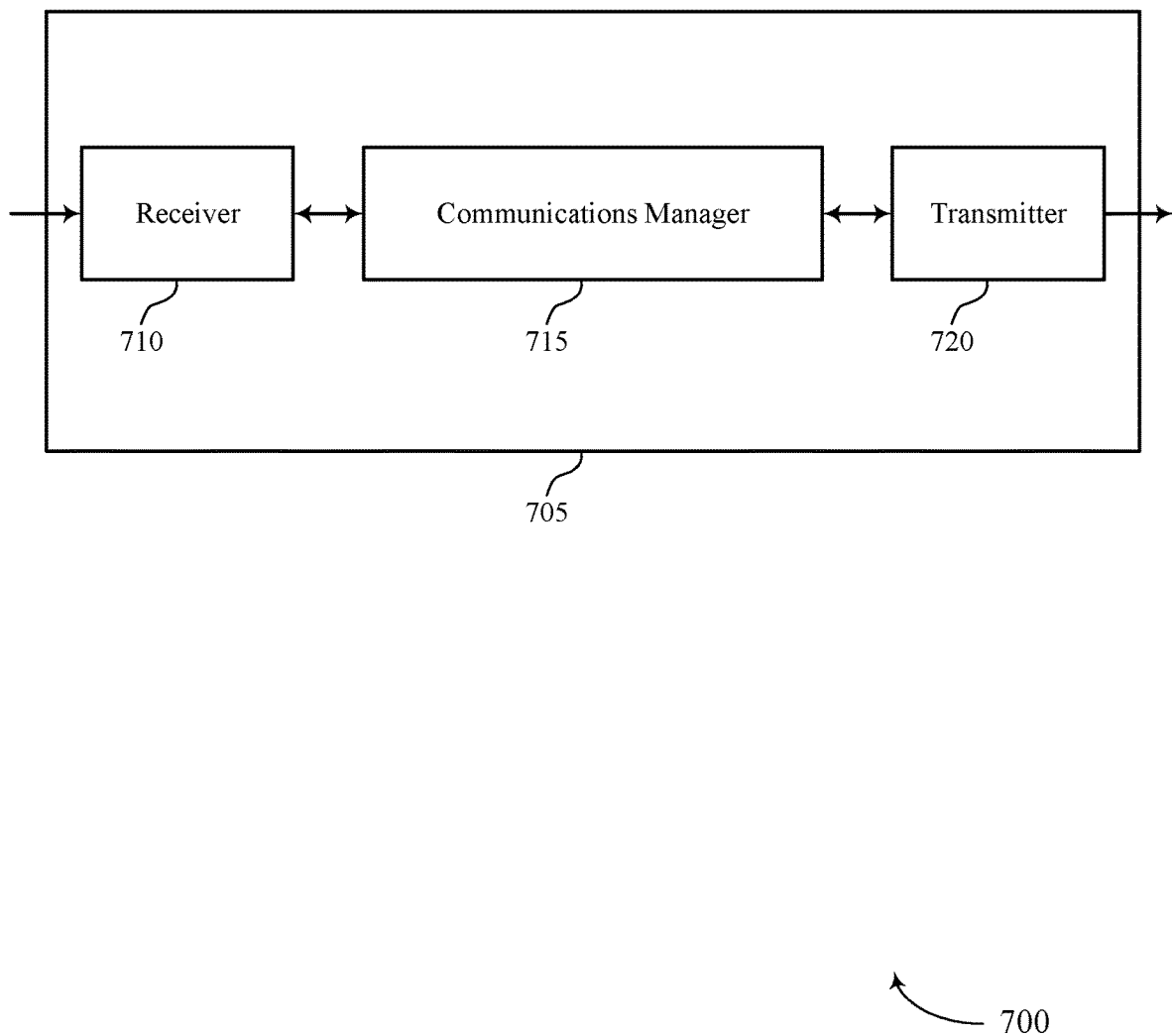
FIGS. 7 and 8 show block diagrams of devices that support emission limit indication techniques for aerial wireless devices in accordance with aspects of the present disclosure.

FIG. 7 shows a block diagram 700 of a device 705 that supports emission limit indication techniques for aerial wireless devices in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to emission limit indication techniques for aerial wireless devices, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, an indication of one or more emission limits for at least a first frequency band, where at least a first emission limit has a first value that is associated with a first UE device type and a second value that is associated with a second UE device type, determine to apply the first value of the first emission limit to one or more uplink transmissions of the UE based on the UE having the first UE device type, and transmit the one or more uplink transmissions from the UE based on the first value of the first emission limit.

The communications manager 715 may also receive, from a base station, an indication of one or more emission limits for at least a first frequency band, where at least a first emission limit has a first value that is associated with a first UE status and a second value that is associated with a second UE status, determine to apply the first value of the first emission limit to one or more uplink transmissions of the UE based on the UE having the first UE status, and transmit the one or more uplink transmissions from the UE based on the first value of the first emission limit. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and the transmitter 720 (or a transceiver module including the receiver 710 and the transmitter 720) may be implemented as analog components (e.g., amplifiers, filters, antennas) coupled with the mobile device modem to enable wireless transmission and reception over one or more bands.

The communications manager 715 as described herein may be implemented to realize one or more potential advantages. In some implementations of the present disclosure, the communications manager 715 may identify an emission limit based on a device type, a device status, or combinations thereof of the device 705. As such, the communications manager 715 may more optimally limit emissions based on the type or status of the device 705, which may result in greater system flexibility. Further, based on having greater flexibility and more optimal emission limits based on the type or status of the device 705, the communications manager 715 may experience a greater achievable throughput, increased spectral efficiency, and an increased likelihood for successful communications between the device 705 and a base station.

Moreover, as a potential result of increased likelihood for successful communications between the device 705 and the base station, the communications manager 715 may spend less time performing computations or processing tasks associated with transmitting or receiving signals, which may enable the communications manager 715 (in full or in part, such as select sub-components) to enter a sleep mode for longer durations or more frequently, which may increase the power savings and battery life of the communications manager 715.

Figure 8:
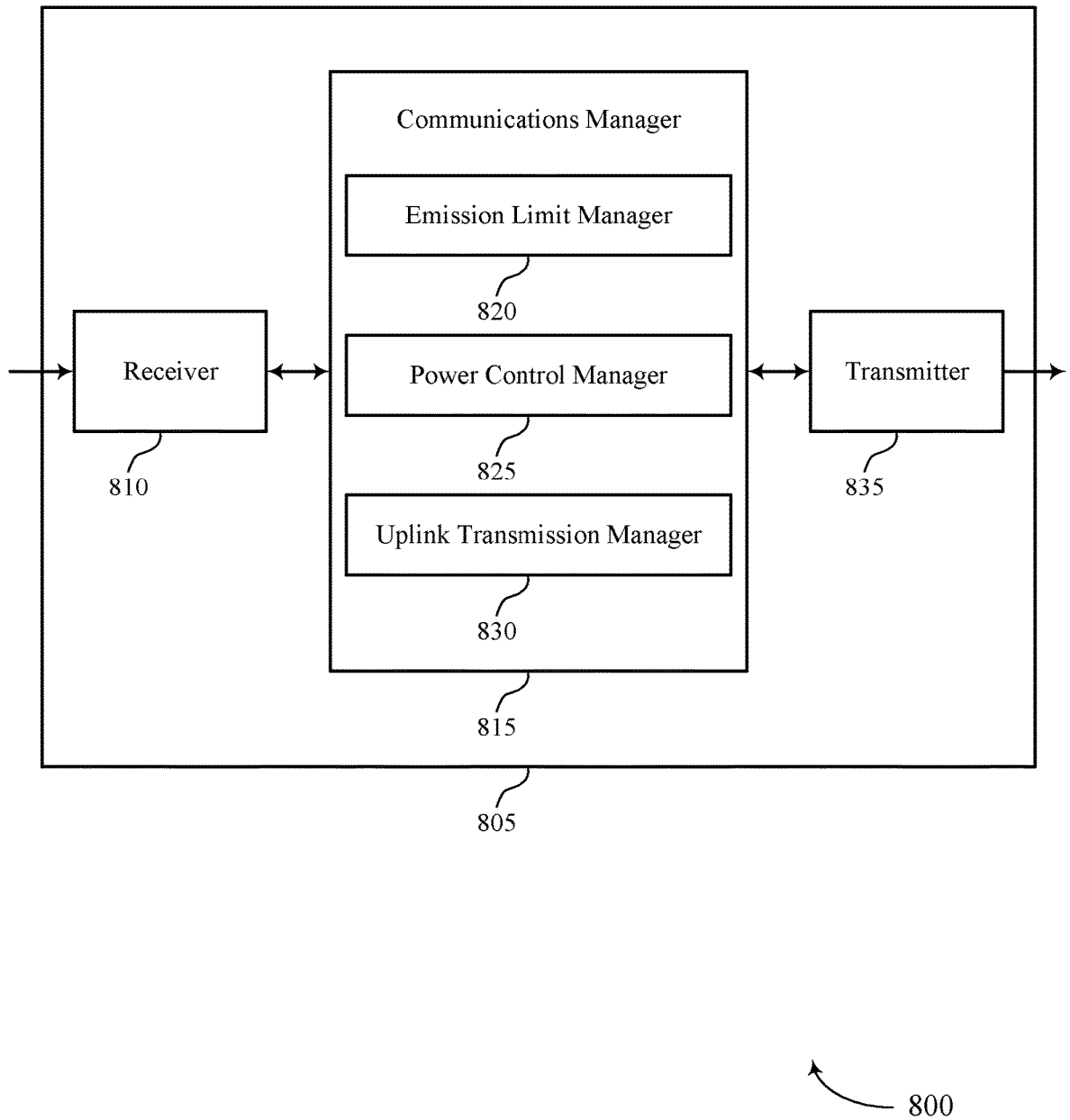

FIG. 8 shows a block diagram 800 of a device 805 that supports emission limit indication techniques for aerial wireless devices in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to emission limit indication techniques for aerial wireless devices, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an emission limit manager 820, a power control manager 825, and an uplink transmission manager 830. The communications manager 815 may be an example of aspects of the communications manager 1010 described herein.

In some cases, the emission limit manager 820 may receive, from a base station, an indication of one or more emission limits for at least a first frequency band, where at least a first emission limit has a first value that is associated with a first UE device type and a second value that is associated with a second UE device type. The power control manager 825 may determine to apply the first value of the first emission limit to one or more uplink transmissions of the UE based on the UE having the first UE device type. The uplink transmission manager 830 may transmit the one or more uplink transmissions from the UE based on the first value of the first emission limit.

In some cases, the emission limit manager 820 may receive, from a base station, an indication of one or more emission limits for at least a first frequency band, where at least a first emission limit has a first value that is associated with a first UE status and a second value that is associated with a second UE status. The power control manager 825 may determine to apply the first value of the first emission limit to one or more uplink transmissions of the UE based on the UE having the first UE status. The uplink transmission manager 830 may transmit the one or more uplink transmissions from the UE based on the first value of the first emission limit.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
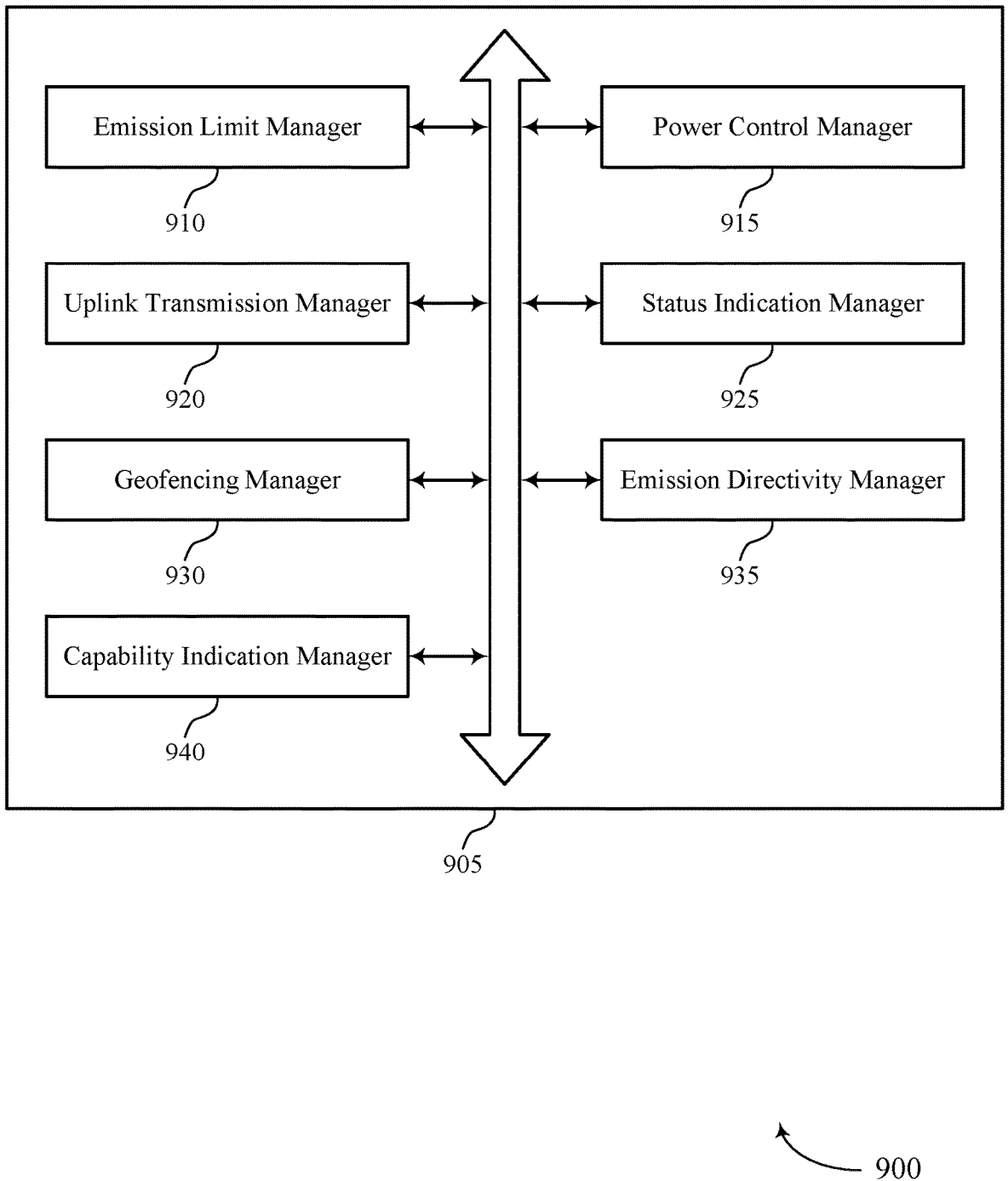
FIG. 9 shows a block diagram of a communications manager that supports emission limit indication techniques for aerial wireless devices in accordance with aspects of the present disclosure.

FIG. 9 shows a block diagram 900 of a communications manager 905 that supports emission limit indication techniques for aerial wireless devices in accordance with aspects of the present disclosure. The communications manager 905 may be an example of aspects of a communications manager 715, a communications manager 815, or a communications manager 1010 described herein. The communications manager 905 may include an emission limit manager 910, a power control manager 915, an uplink transmission manager 920, a status indication manager 925, a geofencing manager 930, an emission directivity manager 935, and a capability indication manager 940. Each of these modules may communicate, directly or indirectly, with one another (e.g., via one or more buses).

The emission limit manager 910 may receive, from a base station, an indication of one or more emission limits for at least a first frequency band, where at least a first emission limit has a first value that is associated with a first UE device type and a second value that is associated with a second UE device type. In some examples, the emission limit manager 910 may transmit an indication of the first device type of the UE to the base station. In some cases, the first UE device type corresponds to UEs that are capable of airborne operations, and the second UE device type corresponds to terrestrial UEs.

In some examples, the emission limit manager 910 may receive, from a base station, an indication of one or more emission limits for at least a first frequency band, where at least a first emission limit has a first value that is associated with a first UE status and a second value that is associated with a second UE status.

In some examples, the emission limit manager 910 may receive a reference signal associated with a victim device, and where the first value of the first emission limit is used for uplink transmissions when a signal strength of the received reference signal is at or above a threshold value, and the second value of the first emission limit is used for uplink transmissions when the signal strength of the received reference signal is below the threshold value.

In some cases, the indication of the one or more emission limits are received in a broadcast transmission from the base station. In some cases, the broadcast transmission from the base station includes a system information block transmission that indicates a list of emission limits for the first frequency band. In some cases, the indication of one or more emission limits is received, responsive to the transmitted indication of the first device type, via one or more of RRC signaling, a MAC-CE, or any combinations thereof. In some cases, the indication of the one or more emission limits is received in a control information communication (e.g., DCI) from the base station. In some cases, the indication of the one or more emission limits further indicates that the first emission limit is applied to UEs having an aerial UE device type.

The power control manager 915 may determine to apply the first value of the first emission limit to one or more uplink transmissions of the UE based on the UE having the first UE device type.

In some examples, the power control manager 915 may determine to apply the first value of the first emission limit to one or more uplink transmissions of the UE based on the UE having the first UE status.

In some examples, the power control manager 915 may determine a power backoff for the one or more uplink transmissions based on the first emission limit. In some examples, the power control manager 915 may apply the power backoff to the one or more uplink transmissions as an A-MPR.

In some examples, the power control manager 915 may transmit an indication to the base station that the first value of the first emission limit is being used at the UE for the one or more uplink transmissions. In some cases, the indication is provided in one or more of a RRC signaling message or a MAC-CE that explicitly indicates the first value of the first emission limit is being used. In some cases, the indication is provided in a power headroom report that is transmitted to the base station that implicitly indicates based on a reported power headroom value that the first value of the first emission limit is being used.

The uplink transmission manager 920 may transmit the one or more uplink transmissions from the UE based on the first value of the first emission limit.

The status indication manager 925 may determine a status of the UE as one of an aerial status or a grounded status, and where the determining to apply the first value of the first emission limit is further based on the determined status of the UE. In some examples, the status indication manager 925 may transmit an indication of one or more of an altitude or a position of the UE to the base station, and where the indication of the one or more emission limits is received from the base station responsive to the altitude or the position of the UE.

In some cases, the status of the UE is based on an altitude of the UE, and where the first value of the first emission limit is applied to the one or more uplink transmissions when the altitude of the UE is at or above a height threshold and the second value of the first emission limit is applied to the one or more uplink transmissions when the altitude of the UE is less than the height threshold. In some cases, the first UE status corresponds to an airborne status and the second UE status corresponds to a grounded status.

The geofencing manager 930 may receive, from the base station, geofencing parameters that indicate one or more locations at which the first value of the first emission limit applies to UEs having the first UE device type, and where the second value of the first emission limit applies to UEs having the first UE device type that are outside of the one or more locations indicated by the geofencing parameters. In some examples, the geofencing manager 930 may determine that a position of the UE is within an area indicated by the geofencing parameters, and where the first value of the first emission limit is applied to at least a first uplink transmission of the UE based on the UE being within the area indicated by the geofencing parameters.

In some examples, the geofencing manager 930 may determine, after transmitting the first uplink transmission, that a subsequent position of the UE is outside of the area indicated by the geofencing parameters. In some examples, the geofencing manager 930 may transmit, based on the subsequent position of the UE, at least a second uplink transmission using the second value of the first emission limit.

In some cases, the geofencing parameters indicate one or more of an area in which the first value of the first emission limit is to be used, an altitude above which the first value of the first emission limit is to be used, vertices of a polyhedron within which the first value of the first emission limit is to be used, a center and radius of a sphere within which the first value of the first emission limit is to be used, or any combinations thereof. In some cases, the first value of the first emission limit is used for all uplink transmissions when UE position information is unavailable.

The emission directivity manager 935 may select a sub-optimal beam from the second subset of transmission beams when a more optimal beam is in the first subset of transmission beams, and where the second value of the first emission limit is used for the one or more uplink transmissions using the sub-optimal beam from the second subset of transmission beams.

In some cases, the determining to apply the first value of the first emission limit is further based on a directional antenna pattern of the UE. In some cases, the indication of one or more emission limits provides a victim location associated with the first value of the first emission limit. In some cases, the second value of the first emission limit is applied to uplink transmissions when the directional antenna pattern is oriented away from the victim location. In some cases, the first value of the first emission limit is applied to uplink transmissions when the directional antenna pattern is oriented toward the victim location.

In some cases, the indication of one or more emission limits provides an indication of a first subset of transmission beams that are associated with the first value of the first emission limit, and where a second subset of transmission beams are associated with the second value of the first emission limit. In some cases, the indication of one or more emission limits includes one or more angular constraints that are associated with the first value of the first emission limit, and where uplink transmissions within the one or more angular constraints are to use the first value of the first emission limit and uplink transmissions outside of the one or more angular constraints are to use the second value of the first emission limit. In some cases, the first value of the first emission limit is used when one or more of a location or an orientation of the UE is unknown.

The capability indication manager 940 may transmit an indication of an additional UE capability to the base station that indicates that the UE has the first device type, and where the indication of the one or more emission limits for the first frequency band is transmitted by the base station to UEs that provide the additional UE capability that indicates the first device type. In some examples, the capability indication manager 940 may receive an indication of access class barring that indicates UEs having the first device type are not accepted at a base station.

Figure 10:
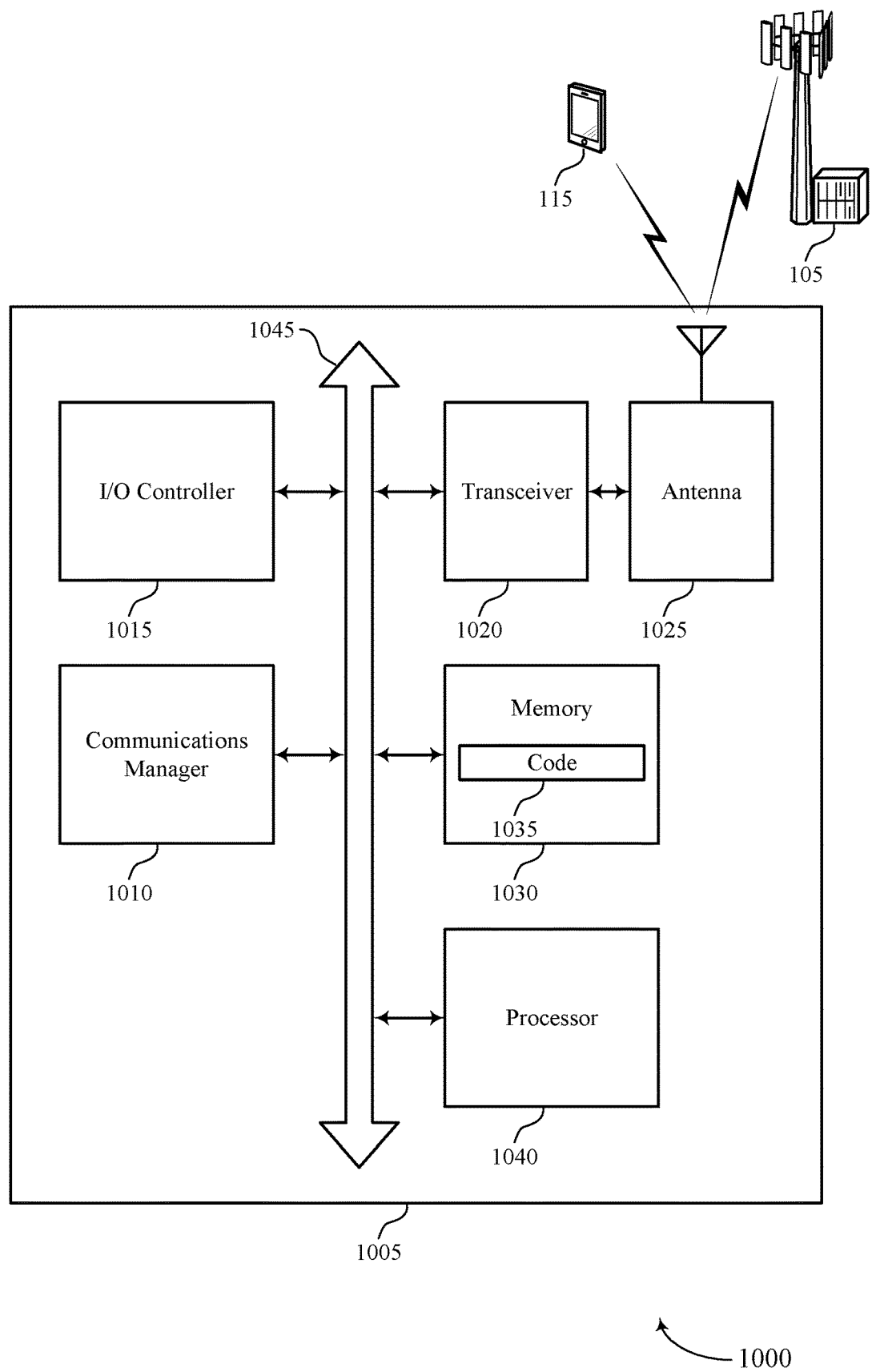
FIG. 10 shows a diagram of a system including a device that supports emission limit indication techniques for aerial wireless devices in accordance with aspects of the present disclosure.

FIG. 10 shows a diagram of a system 1000 including a device 1005 that supports emission limit indication techniques for aerial wireless devices in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be coupled (e.g., in electronic communication) via one or more buses (e.g., bus 1045).

The communications manager 1010 may receive, from a base station, an indication of one or more emission limits for at least a first frequency band, where at least a first emission limit has a first value that is associated with a first UE device type and a second value that is associated with a second UE device type, determine to apply the first value of the first emission limit to one or more uplink transmissions of the UE based on the UE having the first UE device type, and transmit the one or more uplink transmissions from the UE based on the first value of the first emission limit.

The communications manager 1010 may also receive, from a base station, an indication of one or more emission limits for at least a first frequency band, where at least a first emission limit has a first value that is associated with a first UE status and a second value that is associated with a second UE status, determine to apply the first value of the first emission limit to one or more uplink transmissions of the UE based on the UE having the first UE status, and transmit the one or more uplink transmissions from the UE based on the first value of the first emission limit.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting emission limit indication techniques for aerial wireless devices).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
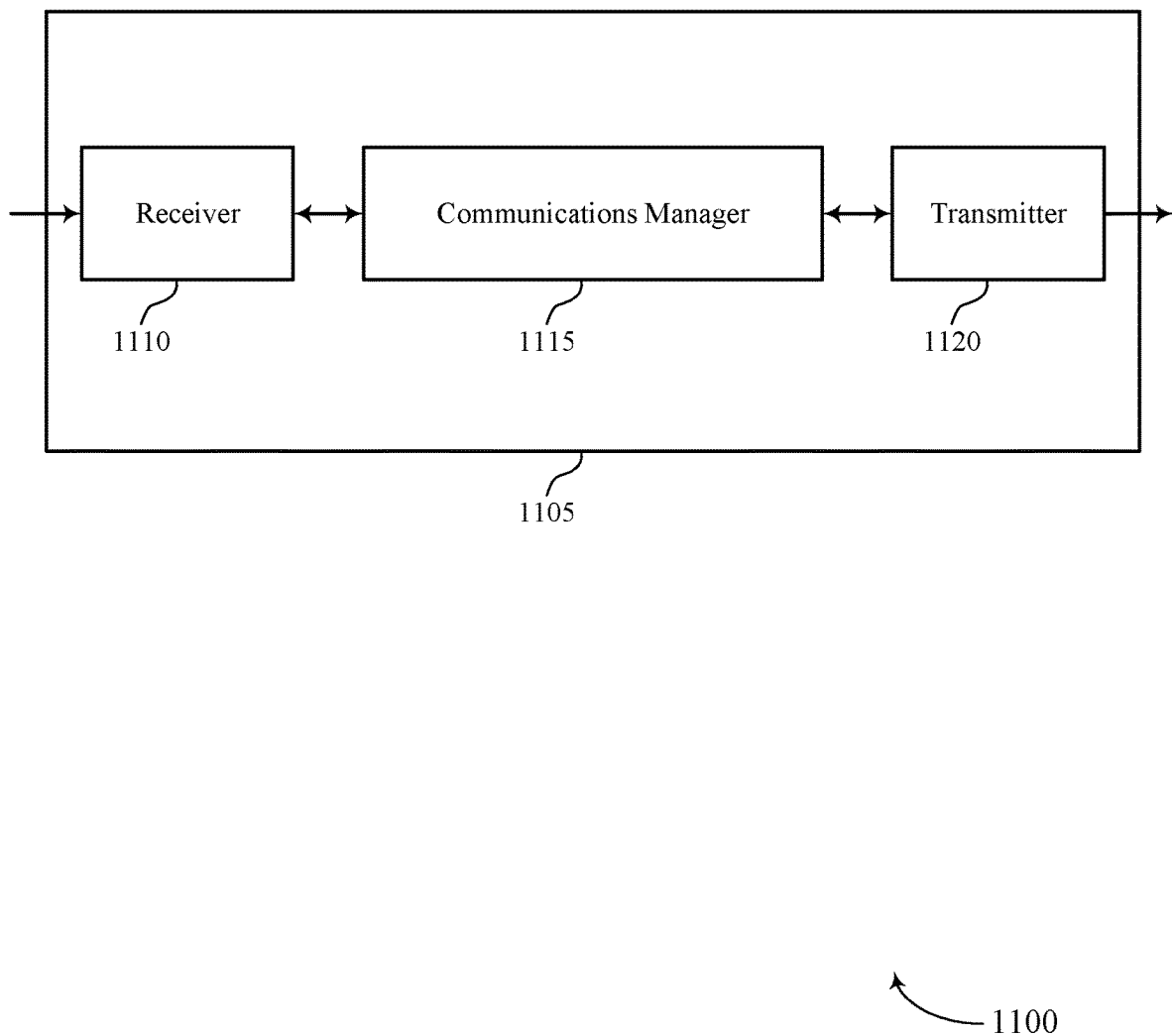
FIGS. 11 and 12 show block diagrams of devices that support emission limit indication techniques for aerial wireless devices in accordance with aspects of the present disclosure.

FIG. 11 shows a block diagram 1100 of a device 1105 that supports emission limit indication techniques for aerial wireless devices in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to emission limit indication techniques for aerial wireless devices, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit an indication of one or more emission limits for at least a first frequency band, where at least a first emission limit has a first value that is associated with a first UE device type and a second value that is associated with a second UE device type and receive one or more uplink transmissions from at least a first UE that have a transmission power that is based on the first value of the first emission limit.

The communications manager 1115 may also transmit an indication of one or more emission limits for at least a first frequency band, where at least a first emission limit has a first value that is associated with a first UE status, and a second value that is associated with a second UE status and receive one or more uplink transmissions from at least a first UE that have a transmission power that is based on the first value of the first emission limit. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

The communications manager 1115 may include one or more components of an integrated circuit and may be implemented to realize one or more potential advantages. In some implementations, the communications manager 1115 may control an emission limit for each of multiple UEs based on the device type, device status, or combinations thereof of each of the multiple UEs. As such, the communications manager 1115 may experience greater flexibility in scheduling decisions, parameter setting, and any other operations that a scheduling device may perform.

In some examples, based on controlling emission limits for different UEs based on the type or status of each of the different UEs, the communications manager 1115 may more optimally determine an emission limit for each of the different UEs. In such examples, the communications manager 1115 may facilitate a greater achievable throughput in the cell served by the device 1105. Accordingly, devices communicating in the cell served by the device 1105 may achieve faster data rates, experience lower latency, and, in some cases, may experience an increase in the likelihood for successful communications. As a potential result of an increase in the likelihood for successful communications, the communications manager 1115 may perform fewer operations associated with scheduling, receiving, or allocating resources to the different UEs, which may increase the spectral efficiency of the system as well as enable greater power savings of the communications manager 1115.

Figure 12:
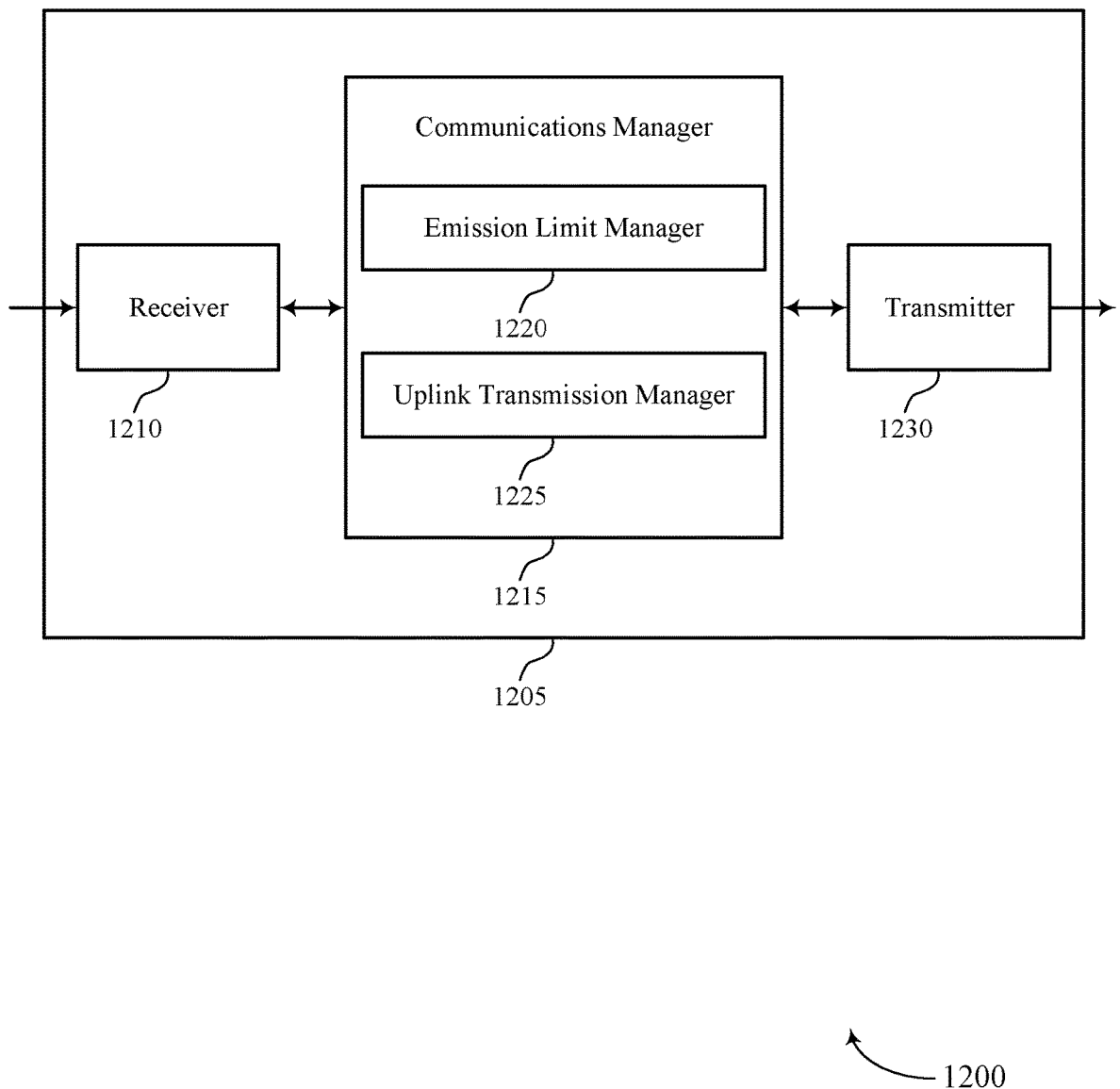

FIG. 12 shows a block diagram 1200 of a device 1205 that supports emission limit indication techniques for aerial wireless devices in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to emission limit indication techniques for aerial wireless devices, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an emission limit manager 1220 and an uplink transmission manager 1225. The communications manager 1215 may be an example of aspects of the communications manager 1410 described herein.

In some cases, the emission limit manager 1220 may transmit an indication of one or more emission limits for at least a first frequency band, where at least a first emission limit has a first value that is associated with a first UE device type and a second value that is associated with a second UE device type. The uplink transmission manager 1225 may receive one or more uplink transmissions from at least a first UE that have a transmission power that is based on the first value of the first emission limit.

In some cases, the emission limit manager 1220 may transmit an indication of one or more emission limits for at least a first frequency band, where at least a first emission limit has a first value that is associated with a first UE status, and a second value that is associated with a second UE status. The uplink transmission manager 1225 may receive one or more uplink transmissions from at least a first UE that have a transmission power that is based on the first value of the first emission limit.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
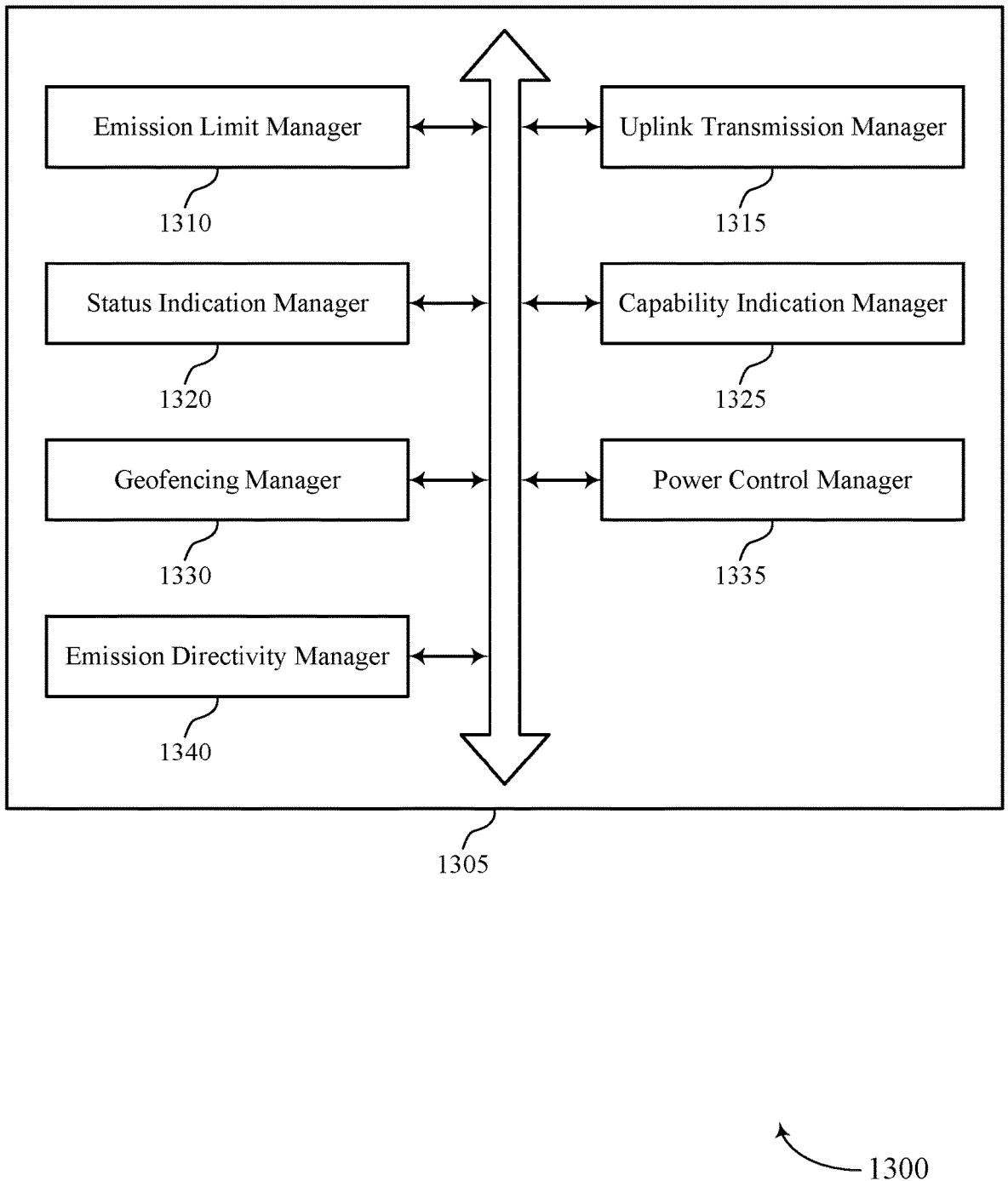
FIG. 13 shows a block diagram of a communications manager that supports emission limit indication techniques for aerial wireless devices in accordance with aspects of the present disclosure.

FIG. 13 shows a block diagram 1300 of a communications manager 1305 that supports emission limit indication techniques for aerial wireless devices in accordance with aspects of the present disclosure. The communications manager 1305 may be an example of aspects of a communications manager 1115, a communications manager 1215, or a communications manager 1410 described herein. The communications manager 1305 may include an emission limit manager 1310, an uplink transmission manager 1315, a status indication manager 1320, a capability indication manager 1325, a geofencing manager 1330, a power control manager 1335, and an emission directivity manager 1340. Each of these modules may communicate, directly or indirectly, with one another (e.g., via one or more buses).

The emission limit manager 1310 may transmit an indication of one or more emission limits for at least a first frequency band, where at least a first emission limit has a first value that is associated with a first UE device type and a second value that is associated with a second UE device type.

In some examples, the emission limit manager 1310 may transmit an indication of one or more emission limits for at least a first frequency band, where at least a first emission limit has a first value that is associated with a first UE status, and a second value that is associated with a second UE status. In some cases, the first UE device type corresponds to UEs that are capable of airborne operations, and the second UE device type corresponds to terrestrial UEs. In some cases, the indication of the one or more emission limits is provided in a broadcast transmission from the base station. In some cases, the broadcast transmission from the base station includes a system information block transmission that indicates a list of emission limits for the first frequency band. In some cases, the indication of the one or more emission limits further indicates that the first emission limit is applied to UEs having an aerial UE device type.

The uplink transmission manager 1315 may receive one or more uplink transmissions from at least a first UE that have a transmission power that is based on the first value of the first emission limit. In some examples, the uplink transmission manager 1315 may receive one or more uplink transmissions from at least a first UE that have a transmission power that is based on the first value of the first emission limit.

The status indication manager 1320 may receive an indication of one or more of an altitude or a position of the first UE, and where the indication of the one or more emission limits is transmitted responsive to the altitude or the position of the UE. In some cases, the indication of the one or more emission limits further provides a status associated with the first value and the second value of the first emission limit, and where an aerial status is associated with the first value and a grounded status is associated with the second value.

In some cases, the aerial status is based on an altitude of a UE, and where the first value of the first emission limit is applied to the one or more uplink transmissions when the altitude of the first UE is at or above a height threshold and the second value of the first emission limit is applied to the one or more uplink transmissions when the altitude of the first UE is less than the height threshold.

The capability indication manager 1325 may receive an indication of the first device type from the first UE. In some examples, the capability indication manager 1325 may receive an indication of an additional UE capability from the first UE that indicates the first device type, and where the indication of the one or more emission limits for the first frequency band is transmitted to UEs that provide the additional UE capability that indicates the first device type.

In some examples, the capability indication manager 1325 may transmit an indication of access class barring that indicates UEs having the first device type are not accepted at the base station. In some cases, the indication of one or more emission limits is transmitted to the first UE responsive to the received indication of the first device type, via one or more of RRC signaling, a MAC-CE, or any combinations thereof.

The geofencing manager 1330 may transmit geofencing parameters with the indication of the one or more emission limits, where the geofencing parameters indicate one or more locations at which the first value of the first emission limit applies to UEs having the first UE device type, and where the second value of the first emission limit applies to UEs having the first UE device type that are outside of the one or more locations indicated by the geofencing parameters. In some examples, the geofencing manager 1330 may transmit geofencing parameters that indicate one or more locations at which the first value of the first emission limit applies, and where the second value of the first emission limit applies to UEs outside of the locations indicated by the geofencing parameters.

In some cases, the geofencing parameters indicate one or more of an area in which the first value of the first emission limit is to be used, an altitude above which the first value of the first emission limit is to be used, vertices of a polyhedron within which the first value of the first emission limit is to be used, a center and radius of a sphere within which the first value of the first emission limit is to be used, or any combinations thereof. In some cases, the first value of the first emission limit is used for all uplink transmissions when UE position information is unavailable.

The power control manager 1335 may receive an indication from the first UE that the first value of the first emission limit is being used at the first UE for the one or more uplink transmissions. In some cases, a power backoff for the one or more uplink transmissions is determined based on the first emission limit and applied as an additional maximum power reduction. In some cases, the indication is provided in one or more of a RRC signaling message or a MAC-CE that explicitly indicates the first value of the first emission limit is being used. In some cases, the indication is provided in a power headroom report that is transmitted to the base station that implicitly indicates based on a reported power headroom value that the first value of the first emission limit is being used.

The emission directivity manager 1340 may determine a direction of emissions from the UE. In some cases, the indication of the one or more emission limits further provide a victim location associated with the first value of the first emission limit, and where the second value of the first emission limit is applied to uplink transmissions when a directional antenna pattern of the first UE is oriented away from the victim location, and the first value of the first emission limit is applied to uplink transmissions when the directional antenna pattern is oriented toward the victim location.

In some cases, the indication of one or more emission limits provides an indication of a first subset of transmission beams that are associated with the first value of the first emission limit, and where a second subset of transmission beams are associated with the second value of the first emission limit.

In some cases, the indication of one or more emission limits includes one or more angular constraints that are associated with the first value of the first emission limit, and where uplink transmissions within the one or more angular constraints are to use the first value of the first emission limit and uplink transmissions outside of the one or more angular constraints are to use the second value of the first emission limit.

Figure 14:
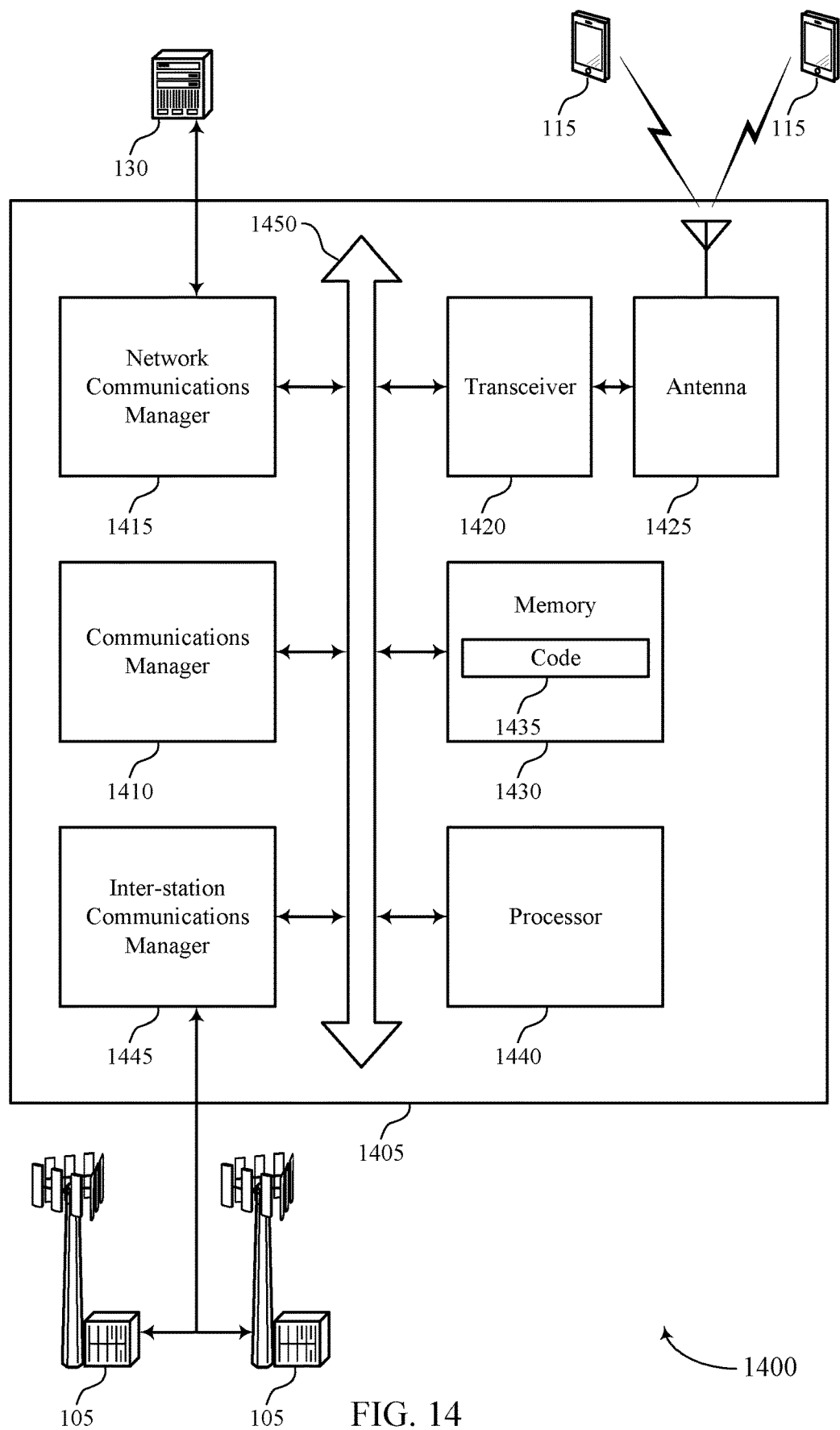
FIG. 14 shows a diagram of a system including a device that supports emission limit indication techniques for aerial wireless devices in accordance with aspects of the present disclosure.

FIG. 14 shows a diagram of a system 1400 including a device 1405 that supports emission limit indication techniques for aerial wireless devices in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be coupled (e.g., in electronic communication) via one or more buses (e.g., bus 1450).

The communications manager 1410 may transmit an indication of one or more emission limits for at least a first frequency band, where at least a first emission limit has a first value that is associated with a first UE device type and a second value that is associated with a second UE device type and receive one or more uplink transmissions from at least a first UE that have a transmission power that is based on the first value of the first emission limit.

The communications manager 1410 may also transmit an indication of one or more emission limits for at least a first frequency band, where at least a first emission limit has a first value that is associated with a first UE status, and a second value that is associated with a second UE status and receive one or more uplink transmissions from at least a first UE that have a transmission power that is based on the first value of the first emission limit.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting emission limit indication techniques for aerial wireless devices).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
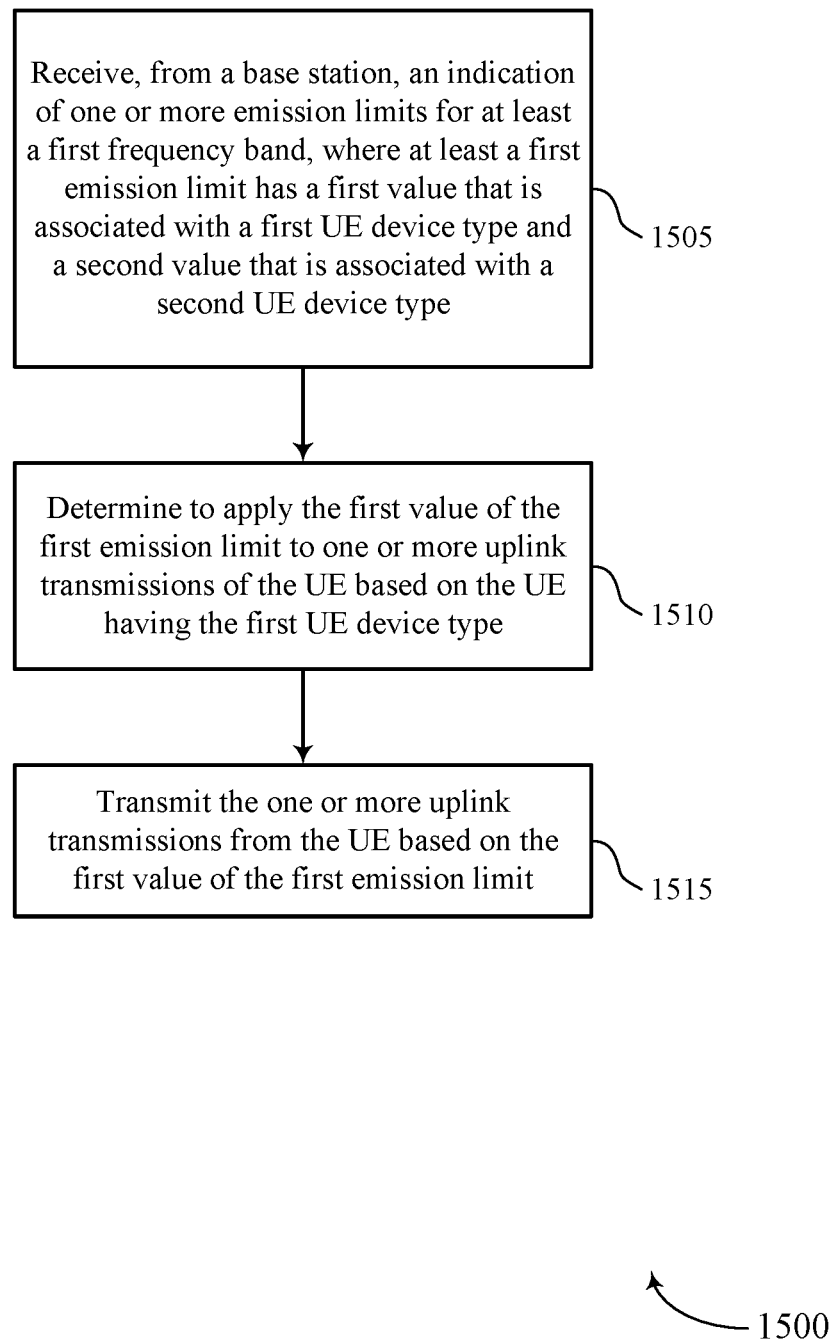
FIGS. 15 through 21 show flowcharts illustrating methods that support emission limit indication techniques for aerial wireless devices in accordance with aspects of the present disclosure.

FIG. 15 shows a flowchart illustrating a method 1500 that supports emission limit indication techniques for aerial wireless devices in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an indication of one or more emission limits for at least a first frequency band, where at least a first emission limit has a first value that is associated with a first UE device type and a second value that is associated with a second UE device type. The operations of 1505 may be performed according to the methods described herein. In some examples, aspects of the operations of 1505 may be performed by an emission limit manager as described with reference to FIGS. 7 through 10.

At 1510, the UE may determine to apply the first value of the first emission limit to one or more uplink transmissions of the UE based on the UE having the first UE device type. The operations of 1510 may be performed according to the methods described herein. In some examples, aspects of the operations of 1510 may be performed by a power control manager as described with reference to FIGS. 7 through 10.

At 1515, the UE may transmit the one or more uplink transmissions from the UE based on the first value of the first emission limit. The operations of 1515 may be performed according to the methods described herein. In some examples, aspects of the operations of 1515 may be performed by an uplink transmission manager as described with reference to FIGS. 7 through 10.

Figure 16:
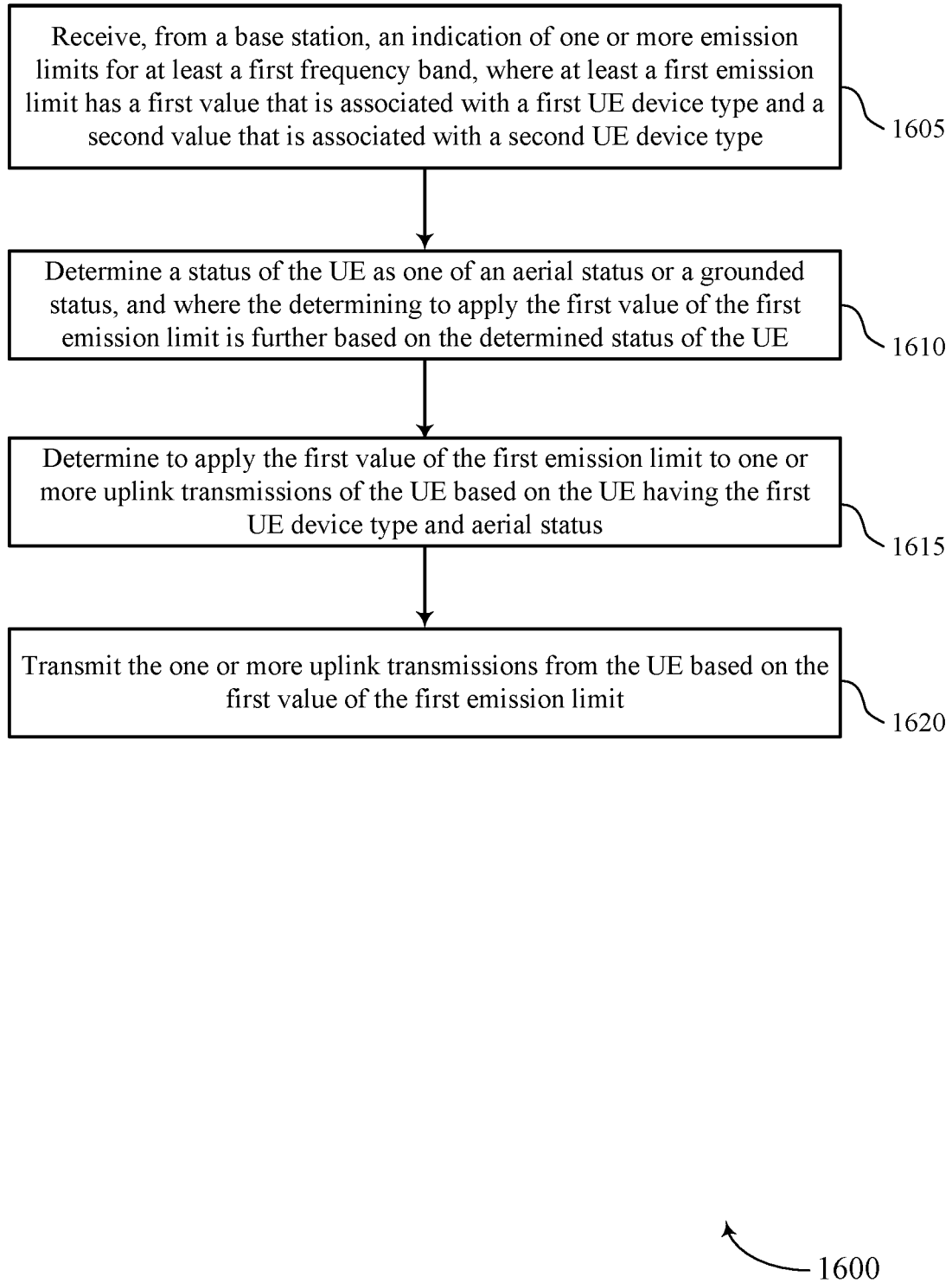

FIG. 16 shows a flowchart illustrating a method 1600 that supports emission limit indication techniques for aerial wireless devices in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, an indication of one or more emission limits for at least a first frequency band, where at least a first emission limit has a first value that is associated with a first UE device type and a second value that is associated with a second UE device type. The operations of 1605 may be performed according to the methods described herein. In some examples, aspects of the operations of 1605 may be performed by an emission limit manager as described with reference to FIGS. 7 through 10.

At 1610, the UE may determine a status of the UE as one of an aerial status or a grounded status, and where the determining to apply the first value of the first emission limit is further based on the status of the UE. The operations of 1610 may be performed according to the methods described herein. In some examples, aspects of the operations of 1610 may be performed by a status indication manager as described with reference to FIGS. 7 through 10. In some cases, the status of the UE is based on an altitude of the UE, and where the first value of the first emission limit is applied to the one or more uplink transmissions when the altitude of the UE is at or above a height threshold and the second value of the first emission limit is applied to the one or more uplink transmissions when the altitude of the UE is less than the height threshold.

At 1615, the UE may determine to apply the first value of the first emission limit to one or more uplink transmissions of the UE based on the UE having the first UE device type and aerial status. The operations of 1615 may be performed according to the methods described herein. In some examples, aspects of the operations of 1615 may be performed by a power control manager as described with reference to FIGS. 7 through 10.

At 1620, the UE may transmit the one or more uplink transmissions from the UE based on the first value of the first emission limit. The operations of 1620 may be performed according to the methods described herein. In some examples, aspects of the operations of 1620 may be performed by an uplink transmission manager as described with reference to FIGS. 7 through 10.

Figure 17:
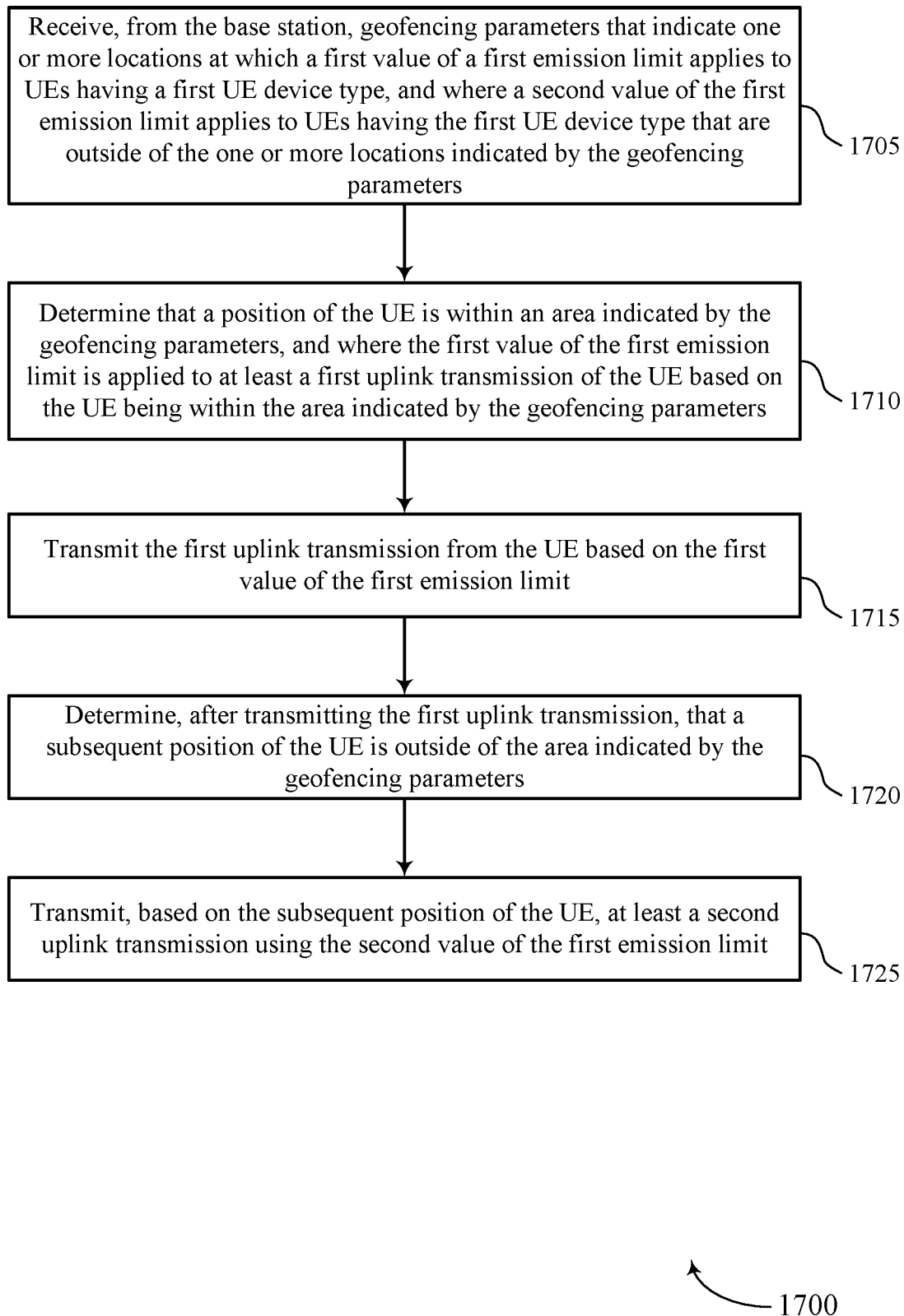

FIG. 17 shows a flowchart illustrating a method 1700 that supports emission limit indication techniques for aerial wireless devices in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, from the base station, geofencing parameters that indicate one or more locations at which a first value of a first emission limit applies to UEs having a first UE device type, and where a second value of the first emission limit applies to UEs having the first UE device type that are outside of the one or more locations indicated by the geofencing parameters. The operations of 1705 may be performed according to the methods described herein. In some examples, aspects of the operations of 1705 may be performed by a geofencing manager as described with reference to FIGS. 7 through 10.

At 1710, the UE may determine that a position of the UE is within an area indicated by the geofencing parameters, and where the first value of the first emission limit is applied to at least a first uplink transmission of the UE based on the UE being within the area indicated by the geofencing parameters. The operations of 1710 may be performed according to the methods described herein. In some examples, aspects of the operations of 1710 may be performed by a geofencing manager as described with reference to FIGS. 7 through 10.

At 1715, the UE may transmit the first uplink transmissions from the UE based on the first value of the first emission limit. The operations of 1715 may be performed according to the methods described herein. In some examples, aspects of the operations of 1715 may be performed by an uplink transmission manager as described with reference to FIGS. 7 through 10.

At 1720, the UE may determine, after transmitting the first uplink transmission, that a subsequent position of the UE is outside of the area indicated by the geofencing parameters. The operations of 1720 may be performed according to the methods described herein. In some examples, aspects of the operations of 1720 may be performed by a geofencing manager as described with reference to FIGS. 7 through 10.

At 1725, the UE may transmit, based on the subsequent position of the UE, at least a second uplink transmission using the second value of the first emission limit. The operations of 1725 may be performed according to the methods described herein. In some examples, aspects of the operations of 1725 may be performed by a geofencing manager as described with reference to FIGS. 7 through 10.

Figure 18:
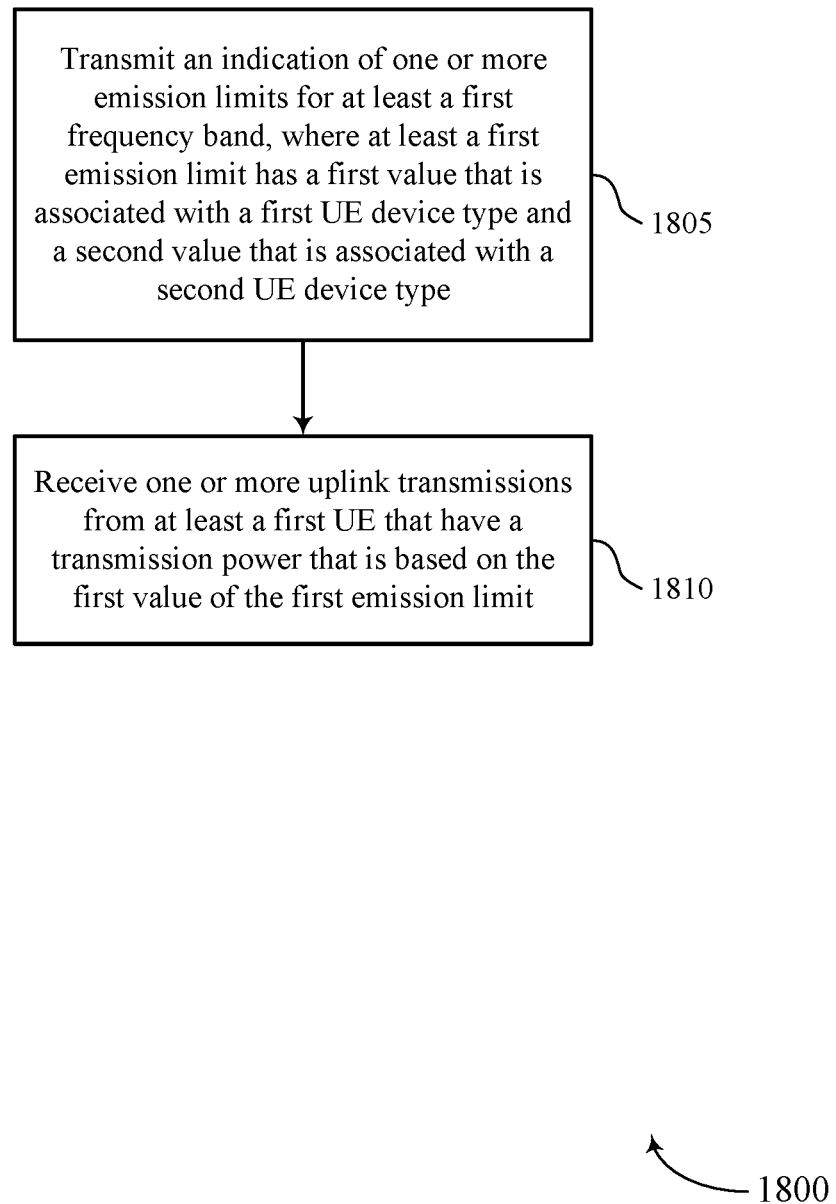

FIG. 18 shows a flowchart illustrating a method 1800 that supports emission limit indication techniques for aerial wireless devices in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may transmit an indication of one or more emission limits for at least a first frequency band, where at least a first emission limit has a first value that is associated with a first UE device type and a second value that is associated with a second UE device type. The operations of 1805 may be performed according to the methods described herein. In some examples, aspects of the operations of 1805 may be performed by an emission limit manager as described with reference to FIGS. 11 through 14.

At 1810, the base station may receive one or more uplink transmissions from at least a first UE that have a transmission power that is based on the first value of the first emission limit. The operations of 1810 may be performed according to the methods described herein. In some examples, aspects of the operations of 1810 may be performed by an uplink transmission manager as described with reference to FIGS. 11 through 14.

Figure 19:
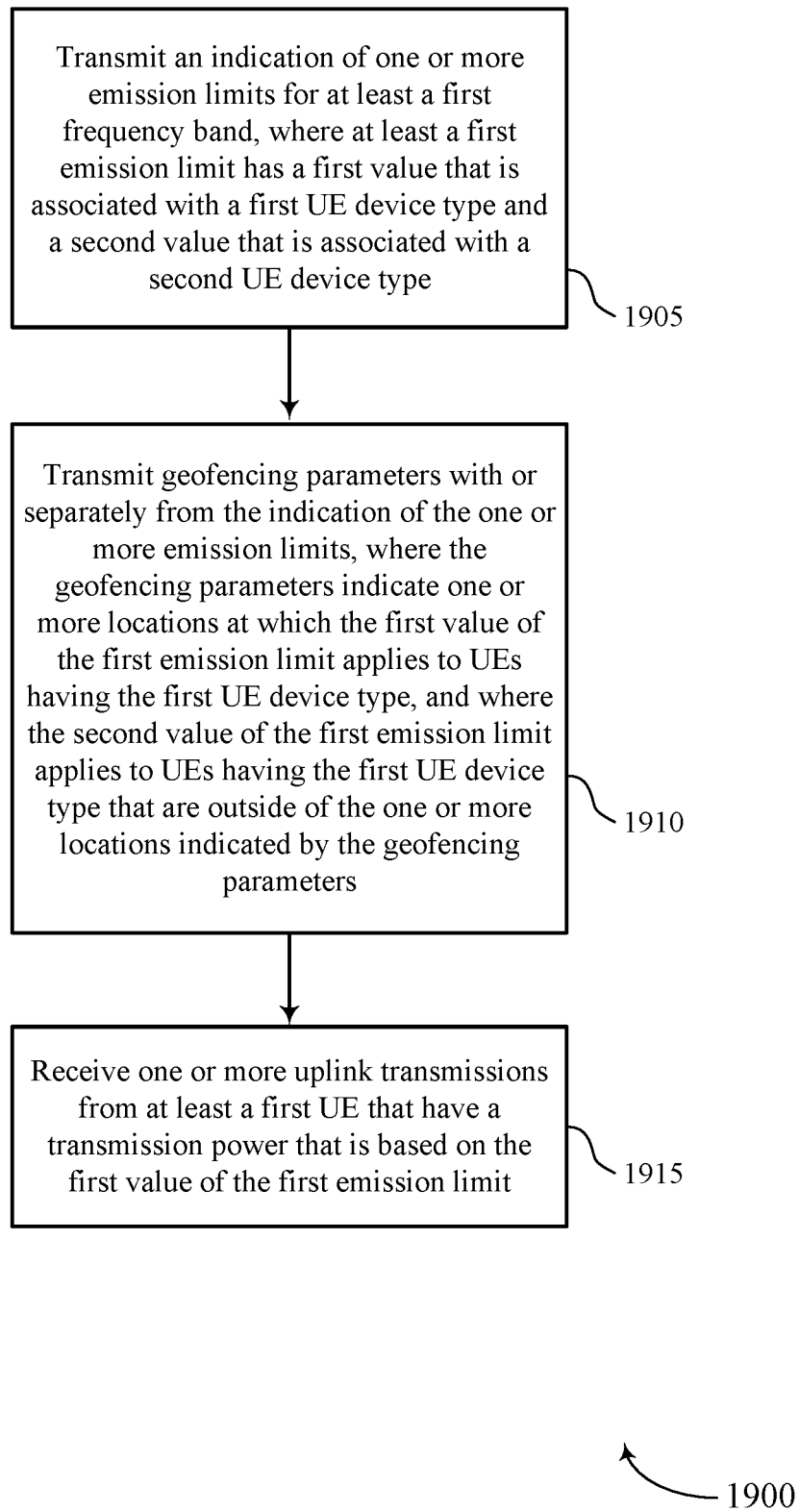

FIG. 19 shows a flowchart illustrating a method 1900 that supports emission limit indication techniques for aerial wireless devices in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may transmit an indication of one or more emission limits for at least a first frequency band, where at least a first emission limit has a first value that is associated with a first UE device type and a second value that is associated with a second UE device type. The operations of 1905 may be performed according to the methods described herein. In some examples, aspects of the operations of 1905 may be performed by an emission limit manager as described with reference to FIGS. 11 through 14.

At 1910, the base station may transmit geofencing parameters with or separately from the indication of the one or more emission limits, where the geofencing parameters indicate one or more locations at which the first value of the first emission limit applies to UEs having the first UE device type, and where the second value of the first emission limit applies to UEs having the first UE device type that are outside of the one or more locations indicated by the geofencing parameters. The operations of 1910 may be performed according to the methods described herein. In some examples, aspects of the operations of 1910 may be performed by a geofencing manager as described with reference to FIGS. 11 through 14.

At 1915, the base station may receive one or more uplink transmissions from at least a first UE that have a transmission power that is based on the first value of the first emission limit. The operations of 1915 may be performed according to the methods described herein. In some examples, aspects of the operations of 1915 may be performed by an uplink transmission manager as described with reference to FIGS. 11 through 14.

Figure 20:
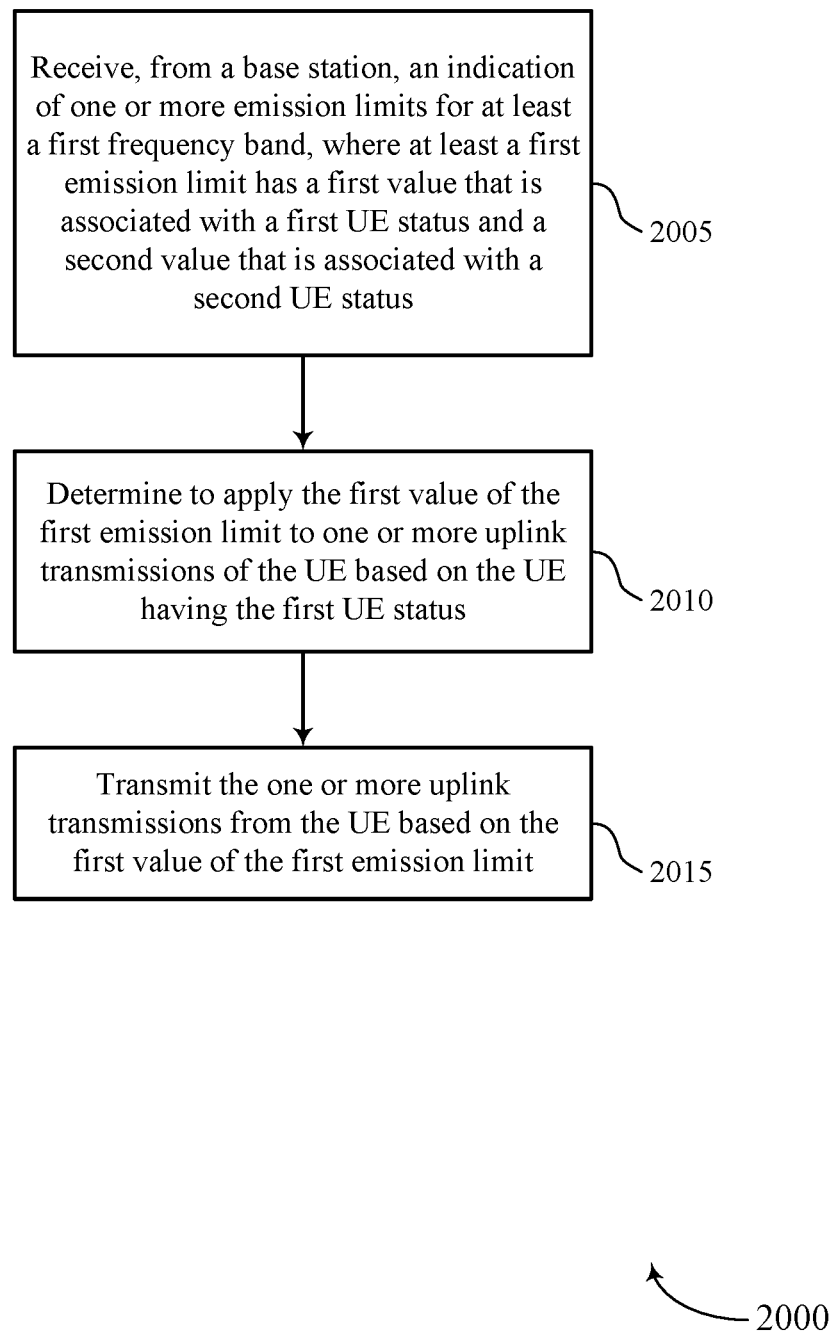

FIG. 20 shows a flowchart illustrating a method 2000 that supports emission limit indication techniques for aerial wireless devices in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 2005, the UE may receive, from a base station, an indication of one or more emission limits for at least a first frequency band, where at least a first emission limit has a first value that is associated with a first UE status and a second value that is associated with a second UE status. The operations of 2005 may be performed according to the methods described herein. In some examples, aspects of the operations of 2005 may be performed by an emission limit manager as described with reference to FIGS. 7 through 10.

At 2010, the UE may determine to apply the first value of the first emission limit to one or more uplink transmissions of the UE based on the UE having the first UE status. The operations of 2010 may be performed according to the methods described herein. In some examples, aspects of the operations of 2010 may be performed by a power control manager as described with reference to FIGS. 7 through 10.

At 2015, the UE may transmit the one or more uplink transmissions from the UE based on the first value of the first emission limit. The operations of 2015 may be performed according to the methods described herein. In some examples, aspects of the operations of 2015 may be performed by an uplink transmission manager as described with reference to FIGS. 7 through 10.

Figure 21:
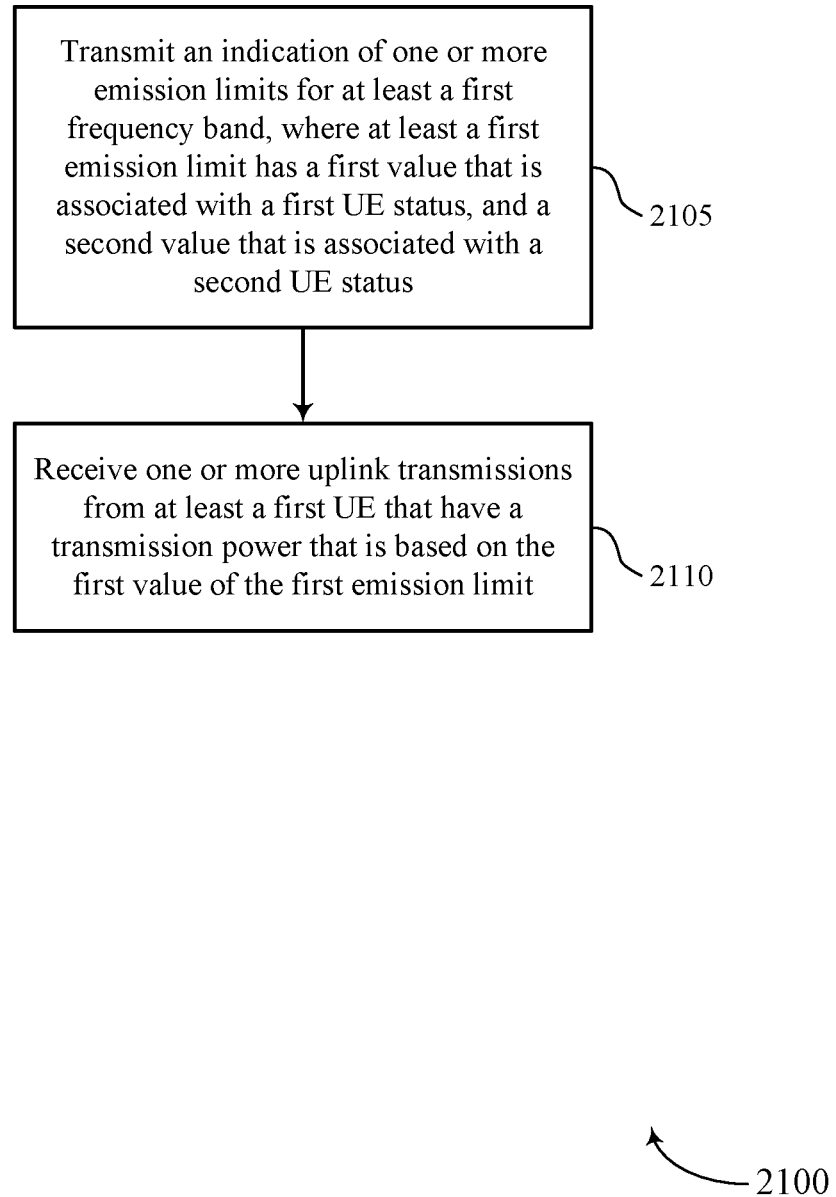

FIG. 21 shows a flowchart illustrating a method 2100 that supports emission limit indication techniques for aerial wireless devices in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may transmit an indication of one or more emission limits for at least a first frequency band, where at least a first emission limit has a first value that is associated with a first UE status, and a second value that is associated with a second UE status. The operations of 2105 may be performed according to the methods described herein. In some examples, aspects of the operations of 2105 may be performed by an emission limit manager as described with reference to FIGS. 11 through 14.

At 2110, the base station may receive one or more uplink transmissions from at least a first UE that have a transmission power that is based on the first value of the first emission limit. The operations of 2110 may be performed according to the methods described herein. In some examples, aspects of the operations of 2110 may be performed by an uplink transmission manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation or step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of one or more emission limits for at least a first frequency band, wherein a first emission limit for communication over the first frequency band includes both a first value that is associated with a first UE device type and a second value that is associated with a second UE device type;
   determining to apply the first value of the first emission limit to one or more uplink transmissions of the UE based at least in part on the UE having the first UE device type; and
   transmitting the one or more uplink transmissions from the UE based at least in part on the first value of the first emission limit.

2. The method of claim 1, wherein the first UE device type corresponds to UEs that are capable of airborne operations, and the second UE device type corresponds to terrestrial UEs.

3. The method of claim 1, wherein the determining further comprises:
   determining a status of the UE as one of an aerial status or a grounded status, and wherein the determining to apply the first value of the first emission limit is further based at least in part on the status of the UE.

4. The method of claim 3, wherein the status of the UE is based at least in part on an altitude of the UE, and wherein the first value of the first emission limit is applied to the one or more uplink transmissions when the altitude of the UE is at or above a height threshold and the second value of the first emission limit is applied to the one or more uplink transmissions when the altitude of the UE is less than the height threshold.

5. The method of claim 1, wherein the indication of the one or more emission limits are received in a broadcast transmission from the base station.

6. The method of claim 1, further comprising:
   transmitting an indication of the first UE device type of the UE to the base station.

7. The method of claim 6, wherein the indication of the one or more emission limits is received, responsive to the transmitted indication of the first UE device type, via one or more of radio resource control signaling, a control element, or any combinations thereof.

8. The method of claim 1, further comprising:
   receiving, from the base station, geofencing parameters that indicate one or more locations at which the first value of the first emission limit applies to UEs having the first UE device type, and wherein the second value of the first emission limit applies to UEs having the first UE device type that are outside of the one or more locations indicated by the geofencing parameters; and
   determining that a position of the UE is within an area indicated by the geofencing parameters.

9. The method of claim 8, wherein the first value of the first emission limit is applied to at least a first uplink transmission of the UE based at least in part on the UE being within the area indicated by the geofencing parameters, the method further comprising:
   determining, after transmitting the first uplink transmission, that a subsequent position of the UE is outside of the area indicated by the geofencing parameters; and
   transmitting, based at least in part on the subsequent position of the UE, at least a second uplink transmission using the second value of the first emission limit.

10. The method of claim 1, further comprising:
    determining a power backoff for the one or more uplink transmissions based at least in part on the first emission limit; and
    applying the power backoff to the one or more uplink transmissions as an additional maximum power reduction.

11. The method of claim 1, further comprising:
    transmitting an indication to the base station that the first value of the first emission limit is being used at the UE for the one or more uplink transmissions.

12. The method of claim 1, wherein the determining to apply the first value of the first emission limit is further based at least in part on a directional antenna pattern of the UE.

13. The method of claim 12, wherein:
the indication of the one or more emission limits provides a victim location associated with the first value of the first emission limit;
the second value of the first emission limit is applied to uplink transmissions when the directional antenna pattern is oriented away from the victim location; and
the first value of the first emission limit is applied to uplink transmissions when the directional antenna pattern is oriented toward the victim location.

14. The method of claim 1, wherein the indication of the one or more emission limits provides an indication of a first subset of transmission beams that are associated with the first value of the first emission limit, and wherein a second subset of transmission beams are associated with the second value of the first emission limit.

15. The method of claim 14, further comprising:
selecting a sub-optimal beam from the second subset of transmission beams when a more optimal beam is in the first subset of transmission beams, and wherein the second value of the first emission limit is used for the one or more uplink transmissions using the sub-optimal beam from the second subset of transmission beams.

16. The method of claim 1, wherein the indication of the one or more emission limits includes one or more angular constraints that are associated with the first value of the first emission limit, and wherein uplink transmissions within the one or more angular constraints are to use the first value of the first emission limit and uplink transmissions outside of the one or more angular constraints are to use the second value of the first emission limit.

17. The method of claim 1, further comprising:
transmitting an indication of one or more of an altitude or a position of the UE to the base station, and wherein the indication of the one or more emission limits is received from the base station responsive to the altitude or the position of the UE.

18. The method of claim 17, wherein the indication of the one or more emission limits is received in a control information communication from the base station.

19. The method of claim 1, further comprising:
transmitting an indication of an additional UE capability to the base station that indicates that the UE has the first UE device type, and wherein the indication of the one or more emission limits for the first frequency band is transmitted by the base station to UEs that provide the additional UE capability that indicates the first UE device type.

20. A method for wireless communication at a base station, comprising:
transmitting an indication of one or more emission limits for at least a first frequency band, wherein a first emission limit for communication over the first frequency band includes both a first value that is associated with a first user equipment (UE) device type and a second value that is associated with a second UE device type; and
receiving one or more uplink transmissions from at least a first UE that have a transmission power that is based at least in part on the first value of the first emission limit.

21. The method of claim 20, wherein the first UE device type corresponds to UEs that are capable of airborne operations, and the second UE device type corresponds to terrestrial UEs.

22. The method of claim 20, wherein the indication of the one or more emission limits further provides a status associated with the first value and the second value of the first emission limit, and wherein an aerial status is associated with the first value and a grounded status is associated with the second value.

23. The method of claim 20, further comprising:
receiving an indication of the first UE device type from the first UE.

24. The method of claim 23, wherein the indication of the one or more emission limits is transmitted to the first UE responsive to the received indication of the first UE device type, via one or more of radio resource control signaling, a control element, or any combinations thereof.

25. The method of claim 20, further comprising:
transmitting geofencing parameters with the indication of the one or more emission limits, wherein the geofencing parameters indicate one or more locations at which the first value of the first emission limit applies to UEs having the first UE device type, and wherein the second value of the first emission limit applies to UEs having the first UE device type that are outside of the one or more locations indicated by the geofencing parameters.

26. The method of claim 20, wherein a power backoff for the one or more uplink transmissions is determined based at least in part on the first emission limit and applied as an additional maximum power reduction.

27. The method of claim 20, further comprising:
receiving an indication of one or more of an altitude or a position of the first UE, and wherein the indication of the one or more emission limits is transmitted responsive to the altitude or the position of the UE.

28. The method of claim 20, further comprising:
receiving an indication of an additional UE capability from the first UE that indicates the first UE device type, and wherein the indication of the one or more emission limits for the first frequency band is transmitted to UEs that provide the additional UE capability that indicates the first UE device type.

29. An apparatus for wireless communication at a user equipment (UE), comprising:
a processor,
memory coupled to the processor;
and instructions stored in the memory and executable by the processor to cause the apparatus to,
receive, from a base station, an indication of one or more emission limits for at least a first frequency band, wherein a first emission limit for communication over the first frequency band includes both a first value that is associated with a first UE device type and a second value that is associated with a second UE device type;
determine to apply the first value of the first emission limit to one or more uplink transmissions of the UE based at least in part on the UE having the first UE device type; and
transmit the one or more uplink transmissions from the UE based at least in part on the first value of the first emission limit.

30. An apparatus for wireless communication at a base station, comprising:
a processor,
memory coupled to the processor; and
instructions stored in the memory and executable by the processor to cause the apparatus to,
transmit an indication of one or more emission limits for at least a first frequency band, wherein a first emission limit for communication over the first frequency band includes both a first value that is associated with a first user equipment (UE) device type and a second value that is associated with a second UE device type; and
receive one or more uplink transmissions from at least a first UE that have a transmission power that is based at least in part on the first value of the first emission limit.

* * * * *